(12) United States Patent
Wen et al.

(10) Patent No.: US 11,468,534 B2
(45) Date of Patent: Oct. 11, 2022

(54) SYSTEM AND METHOD FOR RECOMMENDING SHARED TRANSPORTATION

(71) Applicant: Honda Motor Co., Ltd., Tokyo (JP)

(72) Inventors: Jon Wen, Los Angeles, CA (US); Christopher Yee, Redondo Beach, CA (US); Michael Jin Kim, Long Beach, CA (US); Joon Young Kim, San Pedro, CA (US)

(73) Assignee: HONDA MOTOR CO., LTD., Tokyo (JP)

( * ) Notice: Subject to any disclaimer, the term of this patent is extended or adjusted under 35 U.S.C. 154(b) by 209 days.

(21) Appl. No.: 16/528,049

(22) Filed: Jul. 31, 2019

(65) Prior Publication Data

US 2021/0035251 A1 Feb. 4, 2021

(51) Int. Cl.
*G06Q 50/30* (2012.01)
*G06Q 30/06* (2012.01)
*G06Q 10/02* (2012.01)

(52) U.S. Cl.
CPC .......... *G06Q 50/30* (2013.01); *G06Q 10/02* (2013.01); *G06Q 30/0631* (2013.01)

(58) Field of Classification Search
CPC ..... G06Q 50/30; G06Q 10/02; G06Q 30/0631
See application file for complete search history.

(56) References Cited

U.S. PATENT DOCUMENTS

| 8,880,239 | B2 | 11/2014 | Kleve et al. |
| 9,275,010 | B2 | 3/2016 | Kote et al. |
| 9,424,696 | B2 | 8/2016 | McQuade et al. |
| 9,870,649 | B1 | 1/2018 | Fields et al. |
| 2007/0239478 | A1 | 10/2007 | Yui et al. |
| 2010/0228405 | A1 | 9/2010 | Morgal et al. |
| 2011/0074350 | A1 | 3/2011 | Kocher |

(Continued)

FOREIGN PATENT DOCUMENTS

| AU | 2015101831 | 2/2016 |
| AU | 2015271971 | 8/2016 |

(Continued)

OTHER PUBLICATIONS

Xie, X. (2017). Fleet-oriented real-time vehicular tracking at urban scale (Order No. 10752989). Available from ProQuest Dissertations and Theses Professional. (2003275325). Retrieved from https://dialog.proquest.com/professional/docview/2003275325?accountid=131444 (Year: 2017).*

*Primary Examiner* — Resha Desai
*Assistant Examiner* — Michelle E Carey
(74) *Attorney, Agent, or Firm* — Rankin, Hill & Clark LLP

(57) ABSTRACT

A system and method for recommending shared transportation that include determining at least one starting location and at least one destination location of a user. The system and method also include determining at least one type of shared transportation that is located within a predetermined distance of at least one pathway that is utilized to reach the at least one destination from the at least one starting location. The system and method further include recommending the at least one type of shared transportation to the user and reserving the at least one type of shared transportation to be utilized by the user based on the user accepting the recommendation.

18 Claims, 8 Drawing Sheets

(56) References Cited

U.S. PATENT DOCUMENTS

| | | | |
|---|---|---|---|
| 2014/0129113 A1 | 5/2014 | Van Wiemeersch et al. | |
| 2014/0129301 A1 | 5/2014 | Van Wiemeersch et al. | |
| 2015/0045068 A1* | 2/2015 | Softer | G01C 21/20 |
| | | | 455/456.3 |
| 2016/0063400 A1* | 3/2016 | Lee | G06Q 10/02 |
| | | | 705/5 |
| 2016/0247096 A1* | 8/2016 | Scicluna | G06Q 50/30 |
| 2016/0364812 A1 | 12/2016 | Cao | |
| 2017/0069144 A1 | 3/2017 | Lawrie-Fussy et al. | |
| 2017/0109659 A1* | 4/2017 | Small | G05D 1/0088 |
| 2018/0091930 A1 | 3/2018 | Jefferies | |
| 2018/0136655 A1* | 5/2018 | Kim | G05D 1/0011 |
| 2020/0150660 A1* | 5/2020 | Kim | B60R 25/24 |
| 2020/0167701 A1* | 5/2020 | Debono | G06V 40/103 |
| 2021/0063173 A1* | 3/2021 | Cope | G06Q 40/08 |

FOREIGN PATENT DOCUMENTS

| | | |
|---|---|---|
| JP | 2017526020 | 9/2017 |
| WO | WO2014052329 | 4/2014 |

* cited by examiner

SYSTEM AND METHOD FOR RECOMMENDING SHARED TRANSPORTATION

BACKGROUND

In many instances, an individual may wish to travel to various locations during a given day. Such locations may include points of interests (POIs) and/or locations that may be regularly visited by the individual. In some areas, such as large cities with increasing traffic congestion and less space for parking, typical usage of a single automobile to reach one or more destinations may consume much time and may require much effort. For example, an individual may find that typical use of an automobile may not be efficient with respect to time, effort, and money as the individual may have to navigate through traffic, find parking spots to park their automobile, pay high parking rates to park their automobile, and/or pay high operating costs.

In some cases, the individual may wish to use public transportation, taxis, and/or ride sharing services. However, the individual may have to take some time to determine a best option for a particular trip at a particular timeframe and such effort may not end up saving any time and/or money. For example, some ride sharing services may charge peak pricing at timeframes with higher traffic periods and/or may require the individual to spend a large amount of time to determine and/or to find another form of transportation that may be cheaper. Additionally, the individual may utilize various internet websites, applications, and/or travel to various locations in order to determine how to reach such transportation options.

BRIEF DESCRIPTION

According to one aspect, a computer-implemented method for recommending shared transportation that includes determining at least one starting location and at least one destination location of a user. The computer-implemented method also includes determining at least one type of shared transportation that is located within a predetermined distance of at least one pathway that is utilized to reach the at least one destination from the at least one starting location. The computer-implemented method further includes recommending the at least one type of shared transportation to the user and reserving the at least one type of shared transportation to be utilized by the user based on the user accepting the recommendation.

According to another aspect, a system for recommending shared transportation that includes a memory storing instructions when executed by a processor cause the processor to determine at least one starting location and at least one destination location of a user. The instructions also cause the processor to determine at least one type of shared transportation that is located within a predetermined distance of at least one pathway that is utilized to reach the at least one destination from the at least one starting location. The instructions further cause the processor to recommend the at least one type of shared transportation to the user and reserve the at least one type of shared transportation to be utilized by the user based on the user accepting the recommendation.

According to still another aspect, a non-transitory computer readable storage medium storing instructions that when executed by a computer, which includes a processor perform a method, the method includes determining at least one starting location and at least one destination location of a user. The method also includes determining at least one type of shared transportation that is located within a predetermined distance of at least one pathway that is utilized to reach the at least one destination from the at least one starting location. The method further includes recommending the at least one type of shared transportation to the user and reserving the at least one type of shared transportation to be utilized by the user based on the user accepting the recommendation.

BRIEF DESCRIPTION OF THE DRAWINGS

The novel features believed to be characteristic of the disclosure are set forth in the appended claims. In the descriptions that follow, like parts are marked throughout the specification and drawings with the same numerals, respectively. The drawing figures are not necessarily drawn to scale and certain figures can be shown in exaggerated or generalized form in the interest of clarity and conciseness. The disclosure itself, however, as well as a preferred mode of use, further objects and advances thereof, will be best understood by reference to the following detailed description of illustrative embodiments when read in conjunction with the accompanying drawings, wherein:

DETAILED DESCRIPTION

Figure 1:
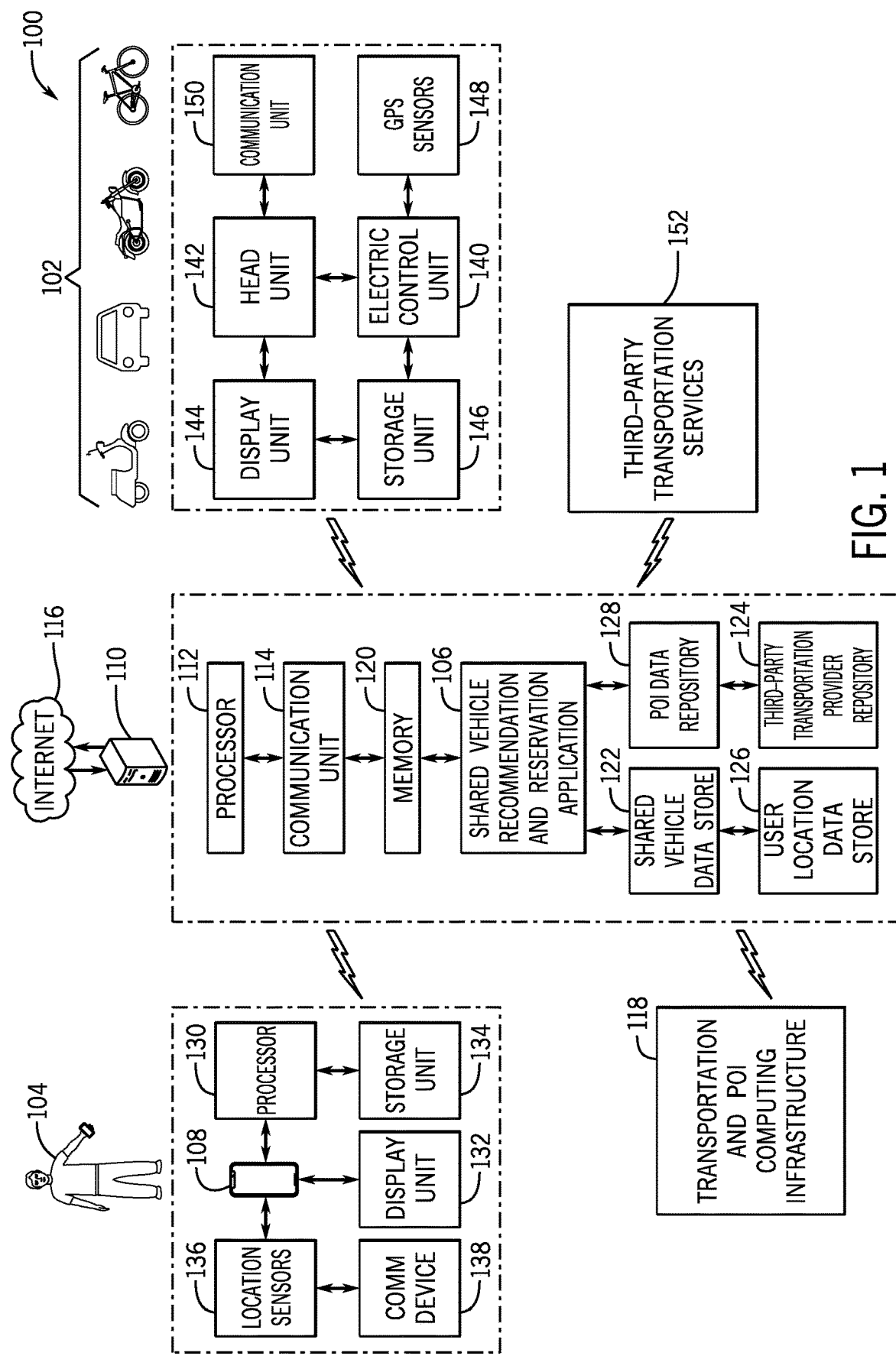
FIG. 1 is a schematic view of an exemplary operating environment for recommending shared transportation according to an exemplary embodiment of a present disclosure.

The following includes definitions of selected terms employed herein. The definitions include various examples and/or forms of components that fall within the scope of a term and that can be used for implementation. The examples are not intended to be limiting.

A "bus,' as used herein, refers to an interconnected architecture that is operably connected to transfer data between computer components within a singular or multiple systems. The bus may be a memory bus, a memory controller, a peripheral bus, an external bus, a crossbar switch, and/or a local bus, among others. The bus may also be a vehicle bus that interconnects components inside a vehicle using protocols such as Controller Area network (CAN), Media Oriented System Transport (MOST), Local Interconnect Network (LIN), among others.

"Computer communication," as used herein, refers to a communication between two or more computing devices (e.g., computer, personal digital assistant, cellular telephone, network device) and may be, for example, a network transfer, a file transfer, an applet transfer, an email, a hypertext transfer protocol (HTTP) transfer, and so on. A computer communication may occur across, for example, a wireless system (e.g., IEEE 802.11), an Ethernet system (e.g., IEEE 802.3), a token ring system (e.g., IEEE 802.5), a local area network (LAN), a wide area network (WAN), a point-to-point system, a circuit switching system, a packet switching system, among others.

An "input device," as used herein may include devices for controlling different vehicle features which include various vehicle components, systems, and subsystems. The term "input device" includes, but it not limited to: push buttons, rotary knobs, and the like. The term "input device" additionally includes graphical input controls that take place within a user interface which may be displayed by various types of mechanisms such as software and hardware based controls, interfaces, or plug and play devices.

A "memory," as used herein may include volatile memory and/or nonvolatile memory. Non-volatile memory may include, for example, ROM (read only memory), PROM (programmable read only memory), EPROM (erasable PROM) and EEPROM (electrically erasable PROM). Volatile memory may include, for example, RAM (random access memory), synchronous RAM (SRAM), dynamic RAM (DRAM), synchronous DRAM (SDRAM), double data rate SDRAM (DDR SDRAM), and direct RAM bus RAM (DRRAM).

A "module," as used herein, includes, but is not limited to, hardware, firmware, software in execution on a machine, and/or combinations of each to perform a function(s) or an action(s), and/or to cause a function or action from another module, method, and/or system. A module may include a software controlled microprocessor, a discrete logic circuit, an analog circuit, a digital circuit, a programmed logic device, a memory device containing executing instructions, and so on.

An "operable connection," as used herein may include a connection by which entities are "operably connected", is one in which signals, physical communications, and/or logical communications may be sent and/or received. An operable connection may include a physical interface, a data interface and/or an electrical interface.

An "output device," as used herein may include devices that may derive from vehicle components, systems, subsystems, and electronic devices. The term "output devices" includes, but is not limited to: display devices, and other devices for outputting information and functions.

A "processor," as used herein, processes signals and performs general computing and arithmetic functions. Signals processed by the processor may include digital signals, data signals, computer instructions, processor instructions, messages, a bit, a bit stream, or other means that may be received, transmitted and/or detected. Generally, the processor may be a variety of various processors including multiple single and multicore processors and co-processors and other multiple single and multicore processor and co-processor architectures. The processor may include various modules to execute various functions.

A "vehicle," as used herein, refers to any moving vehicle that is capable of carrying one or more human occupants and is powered by any form of energy. The term "vehicle" includes, but is not limited to: cars, trucks, vans, minivans, SUVs, motorcycles, scooters, boats, personal watercraft, and aircraft. In some cases, a motor vehicle includes one or more engines.

A "vehicle system," as used herein may include, but are not limited to, any automatic or manual systems that may be used to enhance the vehicle, driving and/or safety. Exemplary vehicle systems include, but are not limited to: an electronic stability control system, an anti-lock brake system, a brake assist system, an automatic brake prefill system, a low speed follow system, a cruise control system, a collision warning system, a collision mitigation braking system, an auto cruise control system, a lane departure warning system, a blind spot indicator system, a lane keep assist system, a navigation system, a transmission system, brake pedal systems, an electronic power steering system, visual devices (e.g., camera systems, proximity sensor systems), a climate control system, an electronic pretensioning system, among others.

Referring now to the drawings, wherein the showings are for purposes of illustrating one or more exemplary embodiments and not for purposes of limiting the same, FIG. 1 is a schematic view of an exemplary operating environment 100 for recommending shared transportation according to an exemplary embodiment of a present disclosure. In an exemplary embodiment, the operating environment 100 may include a plurality of shared vehicles 102 that may be owned and/or operated by a business entity. In some examples, the business entity that owns and/or operates the plurality of shared vehicles 102 may include a vehicle manufacturer (OEM), a corporation, a retailer, and/or a third-party entity (e.g., application developer) that may lease one or more of the plurality of vehicles 102 to one or more users 104 (e.g., application users, customers/clients) of a shared vehicle recommendation and reservation application 106 (shared vehicle application 106) for one or more periods of time (e.g., short-term lease, hourly lease, daily lease).

In an exemplary embodiment, the plurality of shared vehicles 102 may include, but may not be limited to, automobiles (e.g., cars, SUVs, pick-up trucks, etc.), standing scooters, scooter bikes, moped bikes, motor cycle bikes, bicycles (e.g., manually operated bicycles) and the like that may be owned and operated by the business entity. In particular, the business entity may provide one or more types of the plurality of shared vehicles 102 at one or more locations of a particular region and/or city that may be based on nearby streets, points of interest, high volume areas, and/or locations that may dictated based on local regulations. For example, the business entity may include one or more leasing stations at one or more locations of a particular city where one or more of the users 104 may be able to pick up automobiles, standing scooters, scooter bikes, moped bikes, motor cycle bikes, and/or bicycles to be leased for a particular period of time.

In one embodiment, the shared vehicle application 106 may be able to determine an intended destination of the user(s) 104 based on the user(s) 104 inputting a particular intended destination through a user interface of the application 106 (discussed in more detail below) and/or through one or more of the shared vehicles 102. As discussed in more detail below, the shared vehicle application 106 may be configured to provide one or more recommendations to the user(s) 104 that are specifically applicable to one or more intended destinations of the user(s) 104. The shared vehicle application 106 may be configured to determine one or more starting locations of the user(s) 104 and one or more intended destinations of the user(s) 104 at one or more points in time during a course of one or more timeframes (e.g., days, weeks, months).

Based on the determination of the one or more starting locations of the user(s) 104 and one or more intended destinations of the user(s) 104, the application 106 may be configured to provide one or more recommendations to the user(s) 104 with respect to leasing of one or more types of shared vehicles 102 (e.g., categories such as automobile, motorcycle, bicycle, scooter, etc.) that may be leased and/or returned at one or more particular locations and at one or more particular price points. In particular, the application 106 may be configured to provide one or more recommendations to the user(s) 104 to lease (pick-up) one or more types of shared vehicles 102 and/or return (drop-off) one or more types of shared vehicles 102 at one or more locations that may be located within a predetermined distance of the starting location(s), at one or more locations that are located within a predetermined distance of one or more pathways that may be utilized to reach the intended destination(s), and/or at one or more locations that exist within a predetermined distance of the intended destination(s).

In an exemplary embodiment, the shared vehicle application 106 may additionally be configured to communicate with one or more third-party transportation service providers (not shown) to determine one or more third-party transportation services 152 that are owned and/or operated by the providers. The one or more third-party transportation services 152 may include but may not be limited to, public transportation providers such as bus services, train services, trolley services, and the like. The third-party transportation services 152 may additionally include taxi service providers and/or ride share providers. The third-party transportation services 152 may also include off-land service providers that may include, but may not be limited to, a ferry service, a water-taxi service, a helicopter service, an airplane service, and the like. In some circumstances, the third-party transportation services 152 may be recommended to the user(s) 104 by the shared vehicle application 106 to reach one or more locations that may include the intended destination(s) of the user(s) 104, that a shared vehicle(s) 102 may be leased at, from one or more locations that the shared vehicle(s) 102 may be returned at, and/or to one or more locations that are located within a predetermined distance of one or more pathways that may be traveled to reach the intended destination(s) of the user(s) 104.

In some circumstances, the shared vehicle application 106 may be configured to compute one or more predicted destinations of the user(s) 104 that may be computed by the application 106 based on one or more routines of the user(s) 104. More specifically, the shared vehicle application 106 may be able to predict one or more destinations of the user(s) 104 based on the gathering of one or more locations in the form of user locational data that may be collected and associated with the user(s) 104. The user locational data may include information pertaining to locations that maybe visited by the user(s) 104 at one or more particular timeframes. Based on the analysis of user locational data, the application 106 may be configured to compute one or more user locational patterns that are based on the gathered user locational data. The one or more user locational patterns may include information as to routinely visited locations that may be visited by the user(s) 104 (e.g., home, work place, gym, stores, restaurants, etc.) that may be utilized to predict one or more destinations of the user(s) 104 at one or more points in time. In one or more configurations, such predicted destinations may also be used to provide one or more recommendations as to one or more points of interest (e.g., stores, restaurants, etc.) that may be presented in addition to one or more recommendations as to one or more types of shared vehicles 102 that may be leased and/or one or more third-party transportation services 152 that may be utilized to reach one or more of the recommended points of interest.

As discussed in more detail below, the shared vehicle application 106 may be configured to present one or more user interfaces that allow the user(s) 104 to reserve one or more shared vehicles 102 and/or to reserve one or more third-party transportation services 152 based on recommendations that may be provided to the user(s) 104. Accordingly, the user(s) 104 may use the user interfaces of the application 106 to provide inputs to reserve one or more types of shared vehicles 102 and/or one or more third-party transportation services 152 (e.g., through one or more third-party transportation service providers for one or more timeframes that may be utilized to reach an intended destination). In one configuration, upon determining that the user(s) 104 has reserved one or more types of shared vehicles 102 and/or one or more third-party transportation services 152, the application 106 may be configured to recommend one or more points of interest that may be of interest to the user(s) 104 that may be determined based on the user locational profile of the user(s) 104.

As an illustrative example, the application 106 may be configured to compute a user locational pattern associated with a particular user 104 that may be based on user locational data that is gathered for a predetermined period of time. The user locational pattern may be analyzed by the application 106 to determine that the user 104 commutes from a home location to a work location around 7:30 AM routinely on Tuesday mornings. The user locational profile may indicate the user communicates from a work location to a particular taco restaurant routinely on Tuesday afternoons around 12:30 PM. The shared vehicle application 106 may accordingly determine one or more types of shared vehicles 102 that may be available at one or more locations that may be located near the user's home, the user's work location, and the taco restaurant as starting locations, the user's workplace and the taco restaurant as intended destinations, and/or located within a predetermined distance(s) of one or more pathways between the starting locations and the intended destinations.

Figure 2:
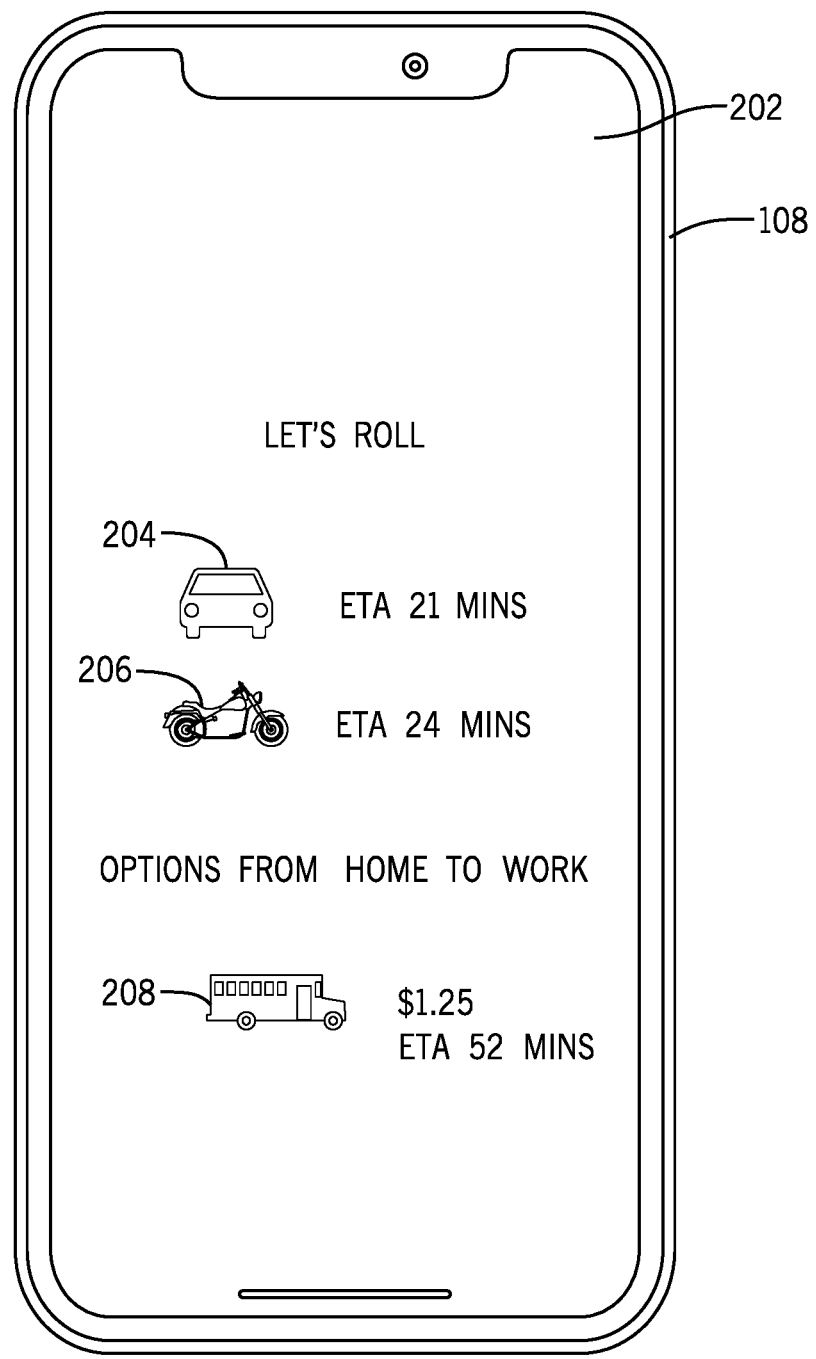
FIG. 2 is an illustrative example of a user interface that is presented to provide one or more recommendations according to an exemplary embodiment of the present disclosure.

With continued reference to the illustrative example, as shown in FIG. 2, the application 106 may present a user interface 202 through a portable device 108 that may be used by the user 104 to provide one or more recommendations to the user 104 on a Tuesday morning. As shown, the application 106 may recommend that the user 104 may reserve one or more types of shared vehicles 102 by presenting user interface input icons 204, 206 that include recommendations of a shared automobile and a shared motor cycle that may be located within a predetermined distance(s) from the user's home to reach the user's work location. The application 106 may also be configured to recommend a third-party transportation bus service by presenting a user interface input icon 208. The application 106 may further may provide an estimated cost to reach the user's work location from the user's home.

The application 106 may additionally estimate an amount of time (ETA) that it may take to reach the predicted destination based on the utilization of the shared automobile, the shared motorcycle, and the third-party transportation bus service. In one or more configurations, the user interface input icons 204, 206, 208 may be inputted by the user(s) 104 to reserve the respective shared automobile, the respective shared motor cycle, or the respective third-party transportation bus service. Accordingly, the user(s) 104 may reserve one of the forms of shared transportation as recommended by the application 106 to reach their work location as an intended destination from their home as a starting location.

Figure 3:
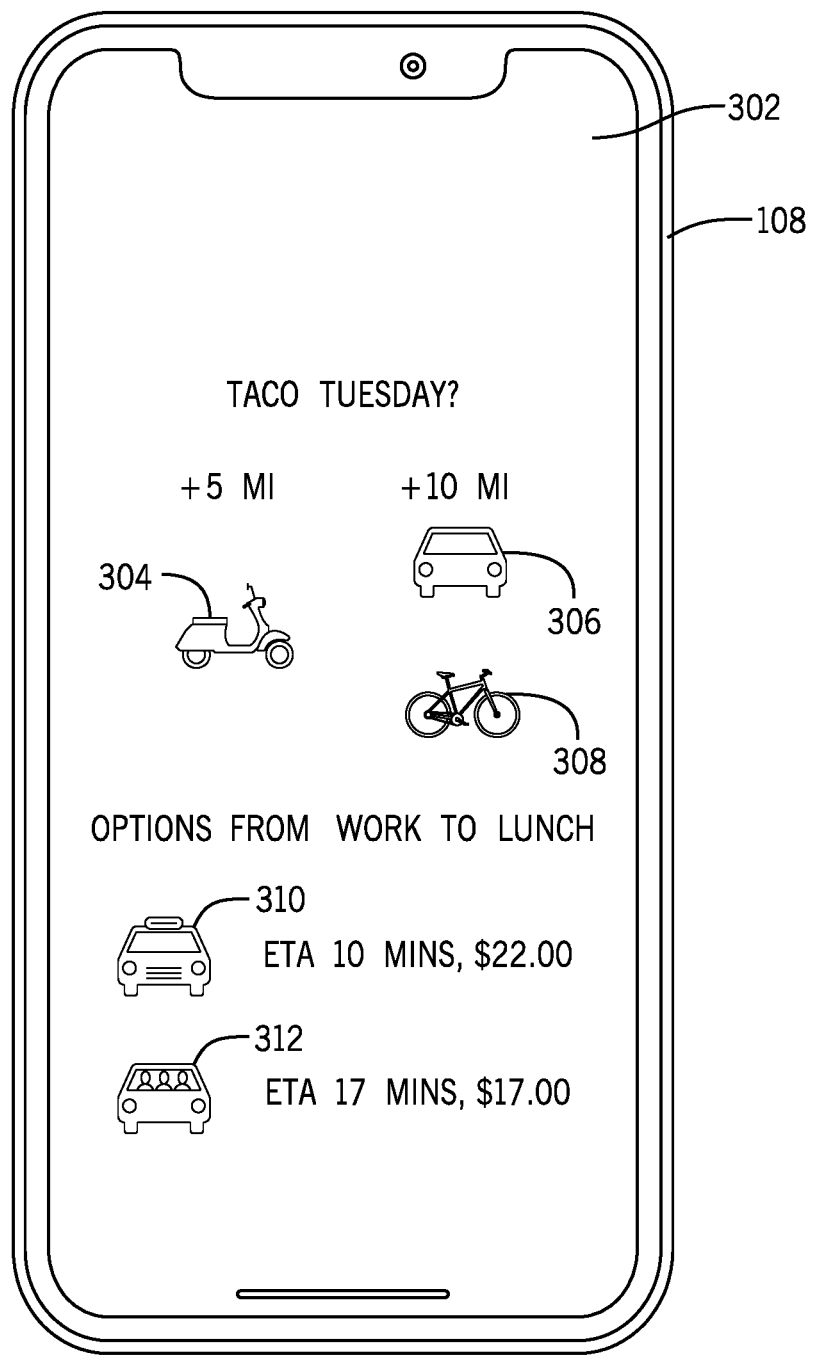
FIG. 3 is an illustrative example of a user interface that is presented to provide one or more recommendations according to an exemplary embodiment of the present disclosure.

With continued reference to the illustrative example, as shown in FIG. 3, the application 106 may present a user interface 302 through the portable device 108 that may be used by the user(s) 104 to provide one or more recommendations to the user(s) 104 on a Tuesday afternoon. As shown, the application 106 may recommend that the user 104 may reserve one or more types of shared vehicles 102 by presenting a user interface input icon 304 that include recommendations of a shared scooter that is located near the user's work location to reach the taco restaurant which is located two miles from the user's work location and to return back to the work location from the taco restaurant.

The application 106 may also present user interface input icons 306, 308 that include recommendations that the user 104 may lease a shared automobile or a shared motorcycle if the user 104 wishes to go to another destination that may be located further than the predicted taco restaurant destination. The application 106 may also be configured to present user interface input icons 310, 312 that include recommendations to a third-party transportation taxi service and a third-party ride share service. In one or more configurations, the user interface input icons 304-308 may be inputted by the user(s) 104 to reserve one or more of the respective shared vehicles 102. Additionally, the user interface input icons 310, 312 may be inputted by the user(s) 104 to reserve one or more respective third-party transportation services 152. Accordingly, the user(s) 104 may reserve one of the forms of shared transportation as recommended by the application 106 to reach their taco restaurant as an intended destination from their work location as a starting location.

Figure 4:
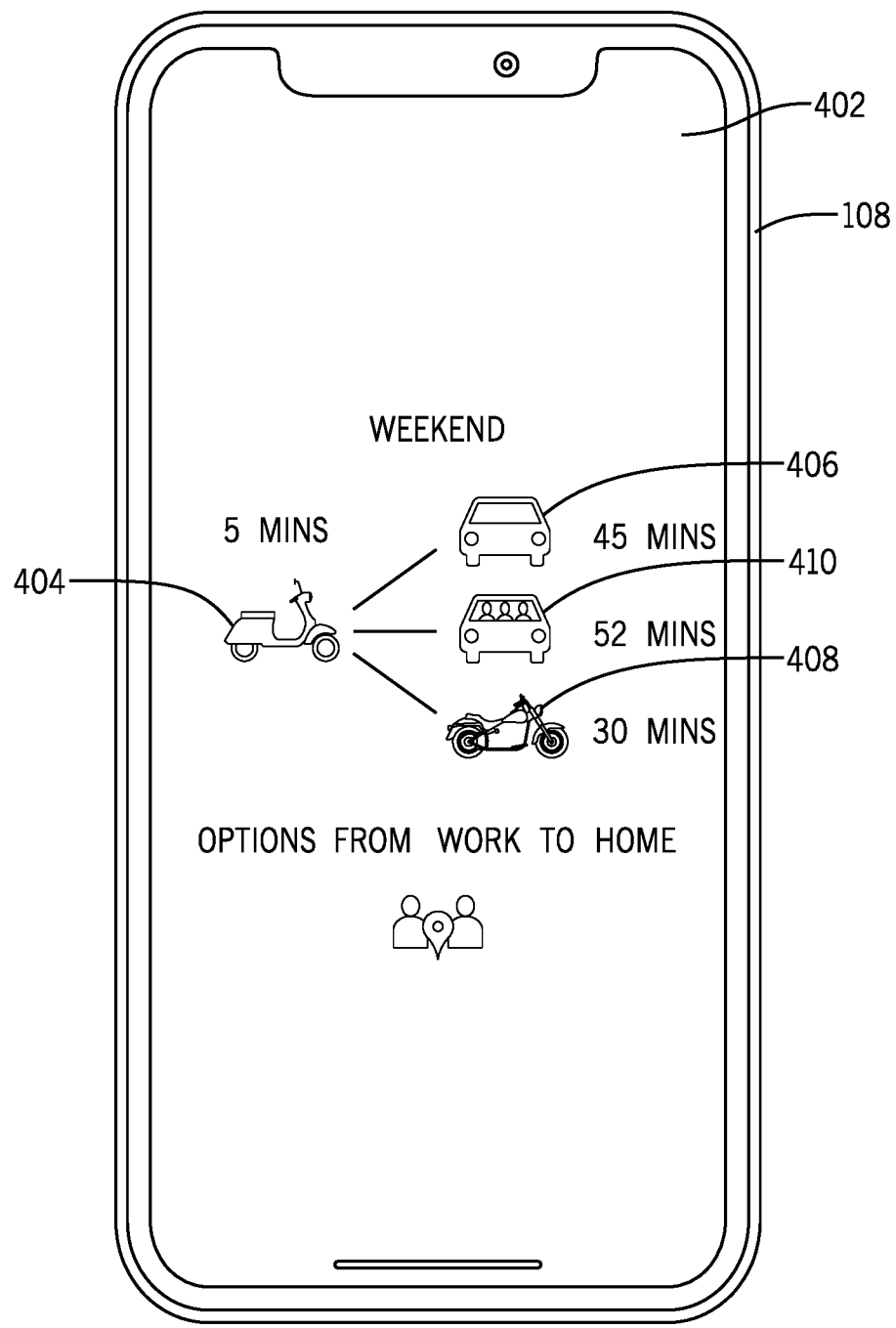
FIG. 4 is an illustrative example of a user interface that is presented to provide one or more recommendations according to an exemplary embodiment of the present disclosure.

As shown in an illustrative example of FIG. 4, the application 106 may present a user interface 402 through the portable device 108 that may be used by the user(s) 104 to recommend numerous types of shared vehicles 102 that may be utilized during a period of time such as a weekend. The application 106 may analyze the user locational profile computed by the application 106 and associated with the user(s) 104 to determine routinely visited starting locations and destinations during one or more prior weekends. The application 106 may thereby provide multiple recommendations pertaining to multiple types of shared vehicles 102 that may be leased to complete one or more portions of travel to reach one or more intended and/or predicted destinations.

As shown, the application 106 may recommend that the user 104 may reserve one or more types of shared vehicles 102 by presenting a user interface input icon 404 that includes a recommendation of a shared scooter that may be located near the user's home that may be utilized to reach another location where the user(s) 104 may lease a shared automobile or a shared motor cycle that may be reserved by inputting respective user interface input icons 406, 408 to reach their intended destination. The application 106 may also recommend an option for the user(s) 104 to utilize a third-party transportation ride share service and may present a user interface input icon 410 that may be inputted by the user(s) 104 to reserve the third-party transportation ride share service. In an alternate embodiment, the application 106 may additionally present a link (not shown) to reach an application user interface or website associated with the third-party transportation ride share service that may be utilized by the user(s) 104 to determine additional information that may pertain to the third-party transportation ride share service (e.g., a particular driver that may provide the service, a rating of the driver, a particular type of vehicle that may be used to provide the service, etc.).

In some configurations, the application 106 may present information via one or more user interfaces that allows the user(s) 104 to determine lease pricing that may be associated with a time of day of the lease, traffic patterns of the pathway(s) between the lease pickup location (starting location) and the intended destination, and/or a price of fuel/energy. Accordingly, the user(s) 104 may be able to utilize the user interface(s) to reserve one or more of the types of shared vehicles 102 and/or the third-party transportation services 152 to be utilized by the user 104 to reach one or more locations.

Referring again to FIG. 1, in an exemplary embodiment, the shared vehicle application 106 may be executed by an externally hosted server infrastructure (external server) 110. The external server 110 may be owned, operated, accessed, and/or maintained by the business entity that owns and/or operates the plurality of shared vehicles 102 and may be used to store data associated with the shared vehicle application 106. In an alternate embodiment, the external server 110 may be owned, operated, accessed, and/or maintained by one or more third-party transportation services 152.

In one embodiment, the external server 110 may include a processor 112 that may operably control one or more components of the external server 110. In some configurations, the processor 112 may be configured to execute the shared vehicle application 106. The processor 112 may be operably connected to a communication unit 114 of the external server 110. The communication unit 114 may include one or more network interface cards (not shown) that may be configured to connect to one or more computing systems through an internet cloud 116. Such computing systems may include, but may not be limited to, the portable device 108 used by the user(s) 104, computing systems (discussed below) of the plurality of shared vehicles 102, and/or a transportation and point of interest computing infrastructure 118 (discussed in more detail below).

The communication unit 114 may be configured to send data pertaining to the presentation of one or more user interfaces of the application 106 to be presented to the user 104 through the portable device 108 and/or through the shared vehicle(s) 102 utilized by the user(s) 102. The communication unit 114 may also be configured to receive data pertaining to one or more inputs provided through one or more user interfaces or provided by one or more components from the portable device 108 and/or the shared vehicle(s) 102 utilized by the user(s) 104.

For example, the communication unit 114 may be configured to send data to the portable device 108 to present one or more user interfaces that may include one or more recommendations to the user(s) 104 with respect to leasing of one or more types of shared vehicles 102 that may be leased and/or returned at one or more particular locations and at one or more particular price points. The communication unit 114 may be configured to receive data from the portable device 108 that pertains to one or more inputs provided by the user(s) 104 to reserve one or more types of shared vehicle(s) 102 that may be recommended to the user(s) 104 or may be selected by the user(s) 104.

In one configuration, the processor 112 may be operably connected to a memory 120 of the external server 110. The memory 120 may be configured to store data files associated with one or more applications, operating systems, vehicle systems, subsystem user interfaces, including but not limited to data files of the shared vehicle application 106. In one configuration, the memory 120 may be configured to store a shared vehicle data store 122 that may be accessed and analyzed by the shared vehicle application 106. The shared vehicle data store 122 may be configured as a relational database/data store that may include various records that may each pertain to shared vehicles 102 that are owned and/or operated by the business entity.

Each record of the shared vehicle data store 122 may be created, prepopulated, and/or updated with data that pertains to a respective shared vehicle 102. Such data may be populated by the business entity and may pertain to, but may not be limited to, a type of shared vehicle (e.g., category such as shared automobile, shared scooter, shared motorcycle, etc.), a description of the shared vehicle 102 (e.g., make, model, two-door, four-door, number of passengers that may accommodated, etc.), a real-time lease price of the type of shared vehicle 102, and/or a particular shared vehicle 102. The real-time lease price may be set by the business entity and/or the application 106 and may be based on a period of time (e.g., price per hour to lease the type of shared vehicle 102), a distance of travel (e.g., price per mile to lease the type of shared vehicle 102), an overall demand to lease one or more types of shared vehicles 102, a cost to operate one or more types of shared vehicles 102, and the like.

In one embodiment, each record of the shared vehicle data store 122 may also be populated by the application 106 with real-time information pertaining to a current real-time geo-location of each shared vehicle 102 in the form of current geo-locational coordinates of each shared vehicle 102 (e.g., GPS, DGPS coordinates). This data may be determined based on communication with GPS sensors 148 that may be included as part of the plurality of shared vehicles 102. Additionally, each record may further be populated with a current leasing status of the shared vehicle(s) 102, a leasing schedule associated with the shared vehicle(s) 102, a real-time fuel/energy level of the shared vehicle(s) 102, and the like.

As discussed below, the application 106 may be configured to access the shared vehicle data store 122 to determine one or more types of shared vehicles 102 to recommend to the user(s) 104. In particular, the application 106 may determine one or more leasing locations at which the shared vehicle(s) 102 may be leased and/or one or more return locations at which the shared vehicle(s) 102 may be returned that may be located a predetermined distance of the starting location(s), at one or more locations that are located within a predetermined distance of one or more pathways that may be utilized to reach the intended destination(s), and/or at one or more locations that exist within a predetermined distance of the intended destination(s).

In some embodiments, the application 106 may determine additional details, including, but not limited to, a number of passengers that one or more types of shared vehicles 102 may accommodate to recommend one or more types of shared vehicles 102 if the user(s) 104 is planning to have one or more individuals accompany the user(s) 104 during utilization of the shared vehicle(s) 102. The application 106 may additionally determine the price to lease one or more types of shared vehicles 102 based on pricing data that may be stored within one or more respective records associated with one or more of the types of the vehicles 102 by the business entity.

As discussed below, the application 106 may additionally be configured to access the shared vehicle data store 122 to update the respective records of one or more types of shared vehicles upon the user(s) 104 reserving one or more respective types of shared vehicles 102. In particular, the shared vehicle application 106 may be configured to update one or more respective records of the shared vehicle data store 122 with reservation data that may include, but may not be limited to, a leasing starting timeframe, a leasing location, a leasing duration, a lease ending timeframe, and leasing return location. The leasing data may be stored within the respective record(s) to be accessed by the business entity to accordingly ensure that the shard vehicle(s) 102 reserved by the user(s) 104 through the application 106 is available to be utilized by the user(s) 104.

Referring again to the memory 120 of the external server 110, the memory 120 may also include a third-party transportation provider repository 124 that may be accessed and analyzed by the shared vehicle application 106. The third-party transportation provider repository 124 may be configured as a relational database/data store that may include various records that may each pertain to respective third-party transportation services 152 that may be operated by one or more transportation providers (e.g., bus service providers, train service providers, taxi service providers, and/or ride share service providers). Each record of the third-party transportation provider repository 124 may be updated based on data that is provided to the transportation and point of interest computing infrastructure 118.

In one embodiment, the transportation and point of interest computing infrastructure 118 may include one or more computing devices that may communicate with one or more third-party transportation service providers and/or one or more third-party entities that may include, but may not be limited to application program developers, navigational application program interfaces providers, search engine developers/providers, reservation applications developers/providers, user review application developers/providers, and the like. In one embodiment, the third-party transportation provider repository 124 may be continually updated in real-time to provide pricing data (e.g., shared third-party vehicle pricing data and/or taxi pricing data at one or more points in time and for one or more distances), scheduling data that may pertain to, but may not be limited to, bus schedule information, train schedule information, locational data, and/or reservation data associated with one or more third-party transportation service providers. Such data may be updated and stored in one or more records associated with an identification and description of one or more respective third party transportation services 152 to be retrieved by the application 106 and presented to the user(s) 104 as a recommendation(s).

More specifically, the application 106 may be configured to access the third-party transportation provider repository 124 to determine one or more third-party transportation services 152 to recommend to the user(s) 104. In particular, the application 106 may determine one or more third-party transportation services 152 that may be accessed by the user(s) 104 within a predetermined distance of the starting location(s), at one or more locations that are located within a predetermined distance of one or more pathways that may be utilized to reach the intended destination(s), and/or at one or more locations that are located within a predetermined distance of the intended destination(s).

In some embodiments, the application 106 may determine additional details, including, but not limited to, a number of passengers that may be accommodated by one or more of the third-party transportation services 152 to recommend one or more particular third-party transportation services 152 to the user(s) 104 if the user(s) 104 provides details that one or more individuals may that accompany the user(s) 104 when utilizing one or more third-party transportation services 152. The application 106 may additionally provide the user(s) 104 with pricing data associated with each third-party transportation service 152, the time of day that the user(s) 104 may utilize the one or more third-party transportation services 152, and/or a distance that may be traveled by the user(s) 104 using one or more third-party transportation services 152 based on pricing data that is updated to the third-party transportation provider repository 124 by the transportation and point of interest computing infrastructure 118.

In an exemplary embodiment, the memory 120 of the external server 110 may additionally be configured to store a user location data store 126 of the shared vehicle application 106. The user location data store 126 may be configured as a relational database/data store that may include various records that may each pertain to the user(s) 104 that is using the application 106. In one or more embodiments, during an initial execution of the application 106, the application 106 may present the user(s) 104 with a user profile creation user interface. The user profile creation user interface may be utilized by the user(s) 104 to create a user profile that is associated with the user(s) 104. The user(s) 104 may be prompted to input profile data that may include, but may not be limited to, the user's name, the user's home address, the user's work address, one or more preferred types of shared vehicles 102 that the user(s) 104 may prefer to utilize, and/or one or more preferred types of third-party transportation services 152 that the user(s) 104 may prefer to utilize, one or more preferred types of payment accounts and associated account numbers for completing payments, one or more favorite points of interest, and the like.

Upon receiving inputs from the user(s) 104 with respect to inputs of one or more types of profile data, the application 106 may be configured to create the user profile and may further associate (e.g., link) the user profile with the user location data store 126. The application 106 may additionally collect user locational data that is associated with the user(s) 104 that may include information pertaining to locations that maybe visited by the user(s) 104 at one or more particular timeframes. In one configuration, the application 106 may be configured to create a record that may be associated with a period of time (e.g., a day, a week, a month) and may update the record with locational data that may be associated with the same period of time. As discussed below, the application 106 may be configured to access the user location data store 126 to analyze the locational data included in one or more records of the data store 126 for one or more periods of time to thereby determine one or more routines that may be followed with respect to one or more locations by the user(s) 104.

In an exemplary embodiment, the memory 120 may also be configured to store a POI data repository 128 of the shared vehicle application 106. The POI data repository 128 may be configured as a relational database/data store that may include various records that pertain to point of interest related data that is updated based on communication with the transportation and point of interest computing infrastructure 118. In one or more embodiments, the shared vehicle application 106 may be configured to access the POI data repository 128 to determine one or more points of interest that are categorized into point of interest categories (POI categories) that are located at particular geo-locations. Such POI categories may include, but may not be limited to, types of retails, types of restaurants, types of businesses, and the like.

In one configuration, the application 106 may determine one or more points of interest to recommend to the user(s) 104 that may be categorized in one or more POI categories. Such recommendations may be provided to the user(s) 104 based on one or more computed user locational patterns that are based on the gathered user locational data, one or more types of shared vehicles 102 that are recommended to the user(s) 104 and/or reserved by the user(s) 104, one or more points of interest that are located within a predetermined distance of one or more pathways that may be utilized to reach the intended and/or predicted destination(s), and/or at one or more points of interest that are located within a predetermined distance of the intended destination(s) and/or predicted destination(s) of the user(s) 104. In an additional embodiment, one or more records that pertain to point of interest related data may additionally include suggestion data, event data, discount data, offer data, and/or additional notification data that may pertain to respective points of interest. In one embodiment, the POI data repository 128 may be updated continually with up to date point of interest related data that is provided by the transportation and point of interest computing infrastructure 118 and used by the application 106 to provide one or more recommendations with respect to one or more points of interest to the user(s) 104.

With particular reference to the portable device 108 used by the user(s) 104 (e.g., portable device 108 carried by the user(s) 104), the portable device 108 may be used to provide inputs to and/or receive data through one or more user interfaces of the shared vehicle application 106. In alternate embodiments, stand-alone computing devices (not shown) may also be used by the user(s) 104 to provide inputs and/or receive data through one or more interfaces of the shared vehicle application 106. The portable device 108 may include, but may not be limited to, mobile devices such as mobile phones or smart phones, hand held devices such as tablets, laptops, e-readers, etc.

In one configuration, components (e.g., electronic components) of the portable device 108 may be operably controlled by a processor 130 that may be configured to provide processing and computing functions. The processor 130 may be configured to execute one or more applications that may include one or more user interfaces that may be displayed through a display unit 132 of the portable device 108. In particular, the processor 130 may be configured to fully or partially execute the shared vehicle application 106 to thereby present one or more user interfaces of the application 106 to the user(s) 104.

In one embodiment, the display unit 132 of the portable device 108 may be configured as a touch input display (not shown) that is capable of receiving touch inputs from the user(s) 104 to provide inputs to one or more user interfaces (e.g., human machine interfaces) of the shared vehicle application 106. The one or more user interfaces of the application 106 may include the user profile creation user interface. As discussed above, the user profile creation user interface may be utilized by the user(s) 104 to create a user profile that is associated with the user(s) 104. Additionally, the one or more user interfaces of the application 106 may include one or more recommendation user interfaces (as shown in the illustrative examples of FIGS. 2, 3, and 4). The one or more recommendation user interfaces may include user interface input icons that may be associated with one or more types of shared vehicles 102, location data, pricing data, and/or timing that may be presented to the user(s) 104 to recommend one or more types of shared vehicles 102.

The application 106 may be configured to determine when one or more user interface input icons that may be associated with one or more types of shared vehicles 102 may be inputted by the user(s) 104 to enable the user(s) 104 to reserve the type of shared vehicle(s) 102 to be leased at a particular location, at a particular point in time, at a particular price point, for a particular timeframe, and/or to be returned at a particular location. The recommendation user interface may also be presented to enable the user(s) 104 to reserve one or more third-party transportation services 152 that may be utilized by the user(s) 104 to reach a particular location and/or an intended destination(s) of the user(s) 104.

In one embodiment, the one or more recommendation user interfaces may also include user interface input icons that may be associated one or more third-party transportation services 152 that may be presented with location data, price data, and/or timing data that may be presented to the user(s) 104 to recommend one or more third-party transportation services 152 to the user(s) 104. The application 106 may be configured to determine when one or more user interface input icons that may be associated with one or more third-party transportation services 152 are inputted to allow the user(s) 104 to reserve one or more third-party transportation services 152 to be utilized at a particular location, at a particular point in time, at a particular price point, for a particular timeframe, and/or to reach a particular location.

In some configurations, the one or more recommendation user interfaces may also be presented with user interface input icons that may be associated with one or more points of interest that may be determined as intended destinations or predicted destinations and/or may be recommended to the user(s) 104. The application 106 may be configured to determine when one or more user interface input icons that may be associated with the one or more points of interest are inputted by the user(s) 104 to present data that may be associated with the one or more respective points of interest (e.g., name, address, details, offerings menu, deals, coupons, mapped location, etc.) Such data may be retrieved by the application 106 from the POI data repository 128.

In one or more embodiments, the processor 130 may be operably connected to a storage unit 134 of the portable device 108. The storage unit 134 may store one more operating systems, applications, associated operating system data, application data, application user interface data, and the like that are executed by the processor 130. In some embodiments, the storage unit 134 of the portable device 108 may be configured to store the user profile that is associated with the user(s) 104. Accordingly, the application 106 may be configured to access the storage unit 134 of the portable device 108 to retrieve the user profile associated with the user(s) 104 to identify the user(s) 104, to provide recommendations that specifically pertain to the user(s) 104, and/or to make reservations for the user(s) 104.

In one embodiment, the storage unit 134 may be configured to store map data (not shown) that may be accessed by location sensors 136 of the portable device 108. The map data may be continually updated based on a computer communication between the portable device 108 and one or more external systems, including, but not limited to, the external server 110 and/or the transportation and point of interest computing infrastructure 118. The map data may be accessed by the location sensors 136 and/or the shared vehicle application 106 to determine geo-locational data, directional data, distance data, environmental data, and point of interest related data pertaining to one or more locations at which the portable device 108 and consequently the user(s) 104 may be located. In particular, the map data may include data that pertains to geographical maps and satellite/aerial imagery of one or more locations at which the portable device 108 is located. In one or more embodiments, the location sensors 136 may be configured to determine a current geo-location of the portable device 108 and may output the current geo-location as current geo-locational coordinates (e.g., GPS/DGPS coordinates) of the portable device 108 to the shared vehicle application 106.

As discussed below, the shared vehicle application 106 may be configured to analyze the current geo-locational coordinates of the portable device 108 to determine one or more starting locations of the user(s) 104 and/or one or more locations of the user(s) 104 during transit to one or more destinations of the user(s) 104 to thereby provide one or more recommendations to the user(s) 104. In some configurations, the application 106 may be configured to analyze the map data stored on the storage unit 134 to determine additional data, including, but not limited to, directional data, distance data, environmental data, and point of interest related data pertaining to the current geo-location of the portable device 108 and consequently the user(s) 104. As discussed below, the application 106 may be configured to evaluate the map data to determine one or more pathways that may be traveled by the user(s) 104 to reach an intended destination or a predicted destination from a starting location and/or one or more additional or alternate locations. The one or more pathways may be further evaluated to determine waypoints that may be included at one or more locations of the pathways which may be utilized to recommend one or more types of shared vehicles 102 and/or one or more third-party transportation services 152 to the user(s) 104.

In an exemplary embodiment, the processor 130 may be operably connected to a communication device 138 of the portable device 108. The communication device 138 may include antennas and components that may be utilized for wired and wireless computer connections and communications via various protocols. The communication device 138 may be capable of providing a wireless system (e.g., IEEE 802.11, IEEE 802.15.1 (Bluetooth®)), a near field communication system (NFC) (e.g., ISO 13157), a local area network (LAN), a wide area network (WAN), a point-to-point system, a circuit switching system, a packet switching system, a cellular network system (e.g., CDMA, GSM, LTE, 3G, 4G), a universal serial bus, and the like.

In one embodiment, the communication device 138 may be configured to wirelessly access the internet cloud 116 and/or directly wirelessly connect to one or more external systems to communicate data to/from the external server 110. The shared vehicle application 106 may utilize the communications between the portable device 108 and the external server 110 to provide one or more functions of the application 106. In some configurations, the communication device 138 may be configured to initiate a wireless connection with one or more shared vehicles 102 that may be utilized by the user(s) 104 to send and receive electronic signals between one or more of the components of the portable device 108 and one or more components of the shared vehicle(s) 102. The shared vehicle application 106 may utilize the communications between the portable device 108 and one or more shared vehicles 102 utilized by the user(s) 104 to provide one or more functions of the application 106.

With particular reference to the one or more shared vehicles 102 that are owned and/or operated by the business entity, the shared vehicle(s) 102 may include a plurality of components that may be operably controlled by an electronic control unit 140 (ECU 140) of the shared vehicle(s) 102. The ECU 140 may be configured to execute one or more operating systems, vehicle system and subsystem executable instructions, vehicle sensor logic, and the like. In one or more embodiments, the ECU 140 may include a microprocessor, one or more application-specific integrated circuit(s) (ASIC), or other similar devices.

The ECU 140 may also include respective internal processing memory, an interface circuit, and bus lines for transferring data, sending commands, and communicating with the plurality of components of the shared vehicle(s) 102. In one or more configurations, the ECU 140 may include a respective communication device (not shown) for sending data internally to components of the shared vehicle(s) 102 and communicating with externally hosted computing systems (not shown) (e.g., external to the shared vehicle(s) 102). Generally the ECU 140 may communicate with a storage unit 146 to execute one or more applications, operating systems, vehicle systems and subsystem user interfaces, and the like that are stored on the storage unit 146.

In one embodiment, the storage unit 146 may be configured to store a shared vehicle profile that may be populated by the business entity that owns and/or operates the respective shared vehicle(s) 102. The shared vehicle profile may include, data that may be pre-populated by the business entity that may include but may not be limited to including, a vehicle identification number (VIN) of the shared vehicle(s) 102, a description of the type of shared vehicle(s) 102 (e.g., two-door automobile, four-door SUV automobile, two seat motor-cycle, etc.), a make and model of the shared vehicle(s) 102, a number of passengers that may be accommodated by the shared vehicle(s) 102, and the like.

Additionally, the shared vehicle profile may be continually populated with data that may include, but may not be limited to, a current leasing status of the shared vehicle(s) 102, a leasing schedule associated with the shared vehicle(s) 102, a real-time fuel/energy level of the shared vehicle(s) 102, and the like. In some configurations, the shared vehicle application 106 may be configured to access the storage unit 146 of the shared vehicle(s) 102 to retrieve data stored within the shared vehicle profile to update data on the shared vehicle data store 122 and/or to supplement or confirm data that may be retrieved from the shared vehicle data store 122 of the application 106.

In an exemplary embodiment, the ECU 140 may also be operably connected to a head unit 142 of the shared vehicle(s) 102. The head unit 142 may be configured to execute one or more applications, application interfaces, and/or to communicate with one or more components of the shared vehicle(s) 102 to provide one or more user interfaces of the shared vehicle application 106 to the user(s) 104 as the user(s) 104 is utilizing the shared vehicle(s) 102. In one embodiment, the head unit 142 may operably control and may be operably connected to a display unit 144 of the shared vehicle(s) 102.

The display unit 144 may include a display screen (not shown) that may be positioned upon a center stack, a handle bar, a center console, a dash board console, and/or one or more additional portions of the shared vehicle(s) 102. However, in additional configurations, the display unit 144 may be configured as one or more display screens that may be alternatively or additionally provided in one or more formats, including, but not limited to, a dash board display, a seat back/cushion display, a pop-up display, a head-up display, a head-mounted display, and a wearable device display. In one or more configurations, the ECU 140 and/or the head unit 142 may operably control the display unit 144 to present the one or more user interfaces (discussed above) of the shared vehicle application 102 to the user(s) 104 as they are utilizing the shared vehicle(s) 102.

In one or more embodiments, the GPS sensors 148 of the shared vehicle(s) 102 may be configured to determine a current geo-location of the shared vehicle(s) 102 and may output the current geo-location as current geo-locational coordinates (e.g., GPS/DGPS coordinates) of the shared vehicle(s) 102 to the shared vehicle application 106. In some configurations, the shared vehicle application 106 may be configured to communicate with the GPS sensors 148 of the shared vehicle(s) 102 to determine the current geo-location of the shared vehicle(s) 102 that may be recommended to the user(s) 104, that may be reserved by the user(s) 104, and/or that may be utilized by the user(s) 104. As discussed, the GPS sensors 148 may output the current geo-location of the shared vehicle(s) 102 as current geo-locational coordinates to the application 106. In some embodiments, the shared vehicle application 106 may be configured to determine the starting location of the user(s) 104, the current location of the user(s) 104 (e.g., utilize the shared vehicle(s) 102), and/or an intended destination of the user(s) 104 based on the current geo-locational coordinates of the shared vehicle(s) 102 as output by the GPS sensors 148.

In an exemplary embodiment, the ECU 140 may be operably connected to a communication unit 150 of the shared vehicle(s) 102. The communication unit 150 may communicate with one or more components of the operating environment 100 and/or additional systems and components outside of the operating environment 100. The communication unit 150 may include, but is not limited to, one or more transceivers (not shown) of the shared vehicle(s) 102 and additional components (not shown) that may be utilized for wired and wireless computer connections and communications via various protocols with a portable device(s) (not shown) that may be carried by the operator and may be located within a (predetermined) communicable range with the communication unit 150 of the shared vehicle(s) 102. For example, the communication unit 150 may be utilized for wired and wireless computer connections that may include an active computer connection with the portable device 108 that may be paired to the shared vehicle(s) 102 as the user(s) 104 utilizes the shared vehicle(s) 102.

In one embodiment, the communication unit 150 may be configured to communicate with the external server 110 through then internet cloud 116. As discussed below, the communication unit 150 may be configured to send and receive data that may be analyzed, accessed, and/or stored by the shared vehicle application 106. For example, the communication unit 150 may be configured to send data pertaining to one or more geo-locations of the shared vehicle(s) 102 to be analyzed by the shared vehicle application 106 to determine a current geo-location of the shared vehicle(s) 102.

The general functionality of the shared vehicle application 106 will now be discussed in more detail with respect to exemplary methods that may be executed by the application 106. In an exemplary embodiment, the shared vehicle application 106 may be fully or partially executed by the processor 112 of the external server 110. Additionally or alternatively, the shared vehicle application 106 may be fully or partially executed by the processor 130 of the portable device 108, the ECU 140 of the shared vehicle(s) 102, and/or the head unit 142 of the shared vehicle(s) 102. The shared vehicle application 106 may utilize the communication unit 114 of the external server 110, the communication device 138 of the portable device 108 and/or the communication unit 150 of the shared vehicle(s) 102 to communicate application related data between the external server 110, the portable device 108, and/or the shared vehicle(s) 102.

Figure 5:
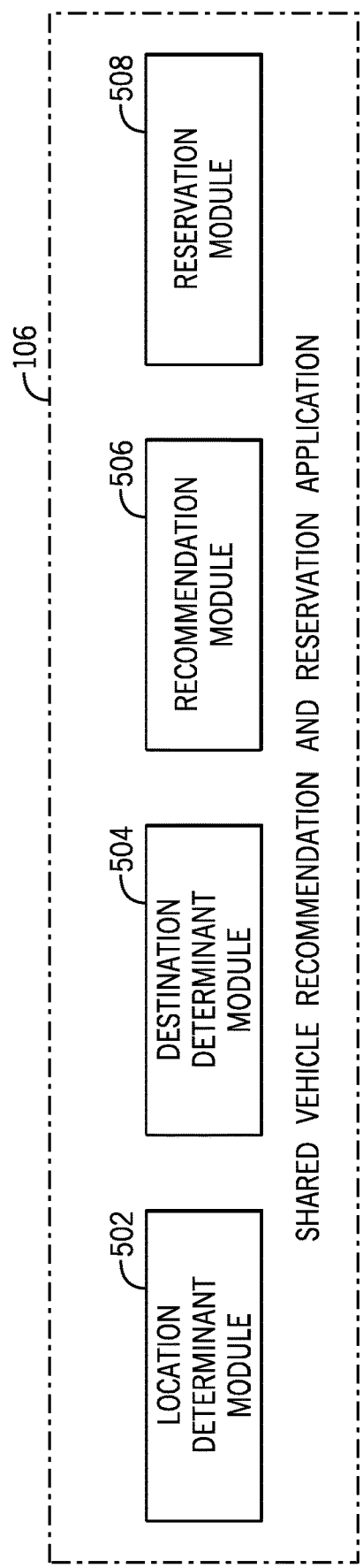
FIG. 5 is a schematic view of a plurality of modules of the shared vehicle application that may execute computer-implemented instructions for recommending shared transportation according to an exemplary embodiment of the present disclosure.

FIG. 5 is a schematic view of a plurality of modules 502-508 of the shared vehicle application 106 that may execute computer-implemented instructions for recommending shared transportation according to an exemplary embodiment of the present disclosure. In an exemplary embodiment, the plurality of modules 502-508 may include a location determinant module 502, a destination determinant module 504, a recommendation module 506, and a reservation module 508. It is appreciated that the shared vehicle application 106 may include one or more additional modules and/or sub-modules that are included in lieu of the modules 502-508.

Figure 6:
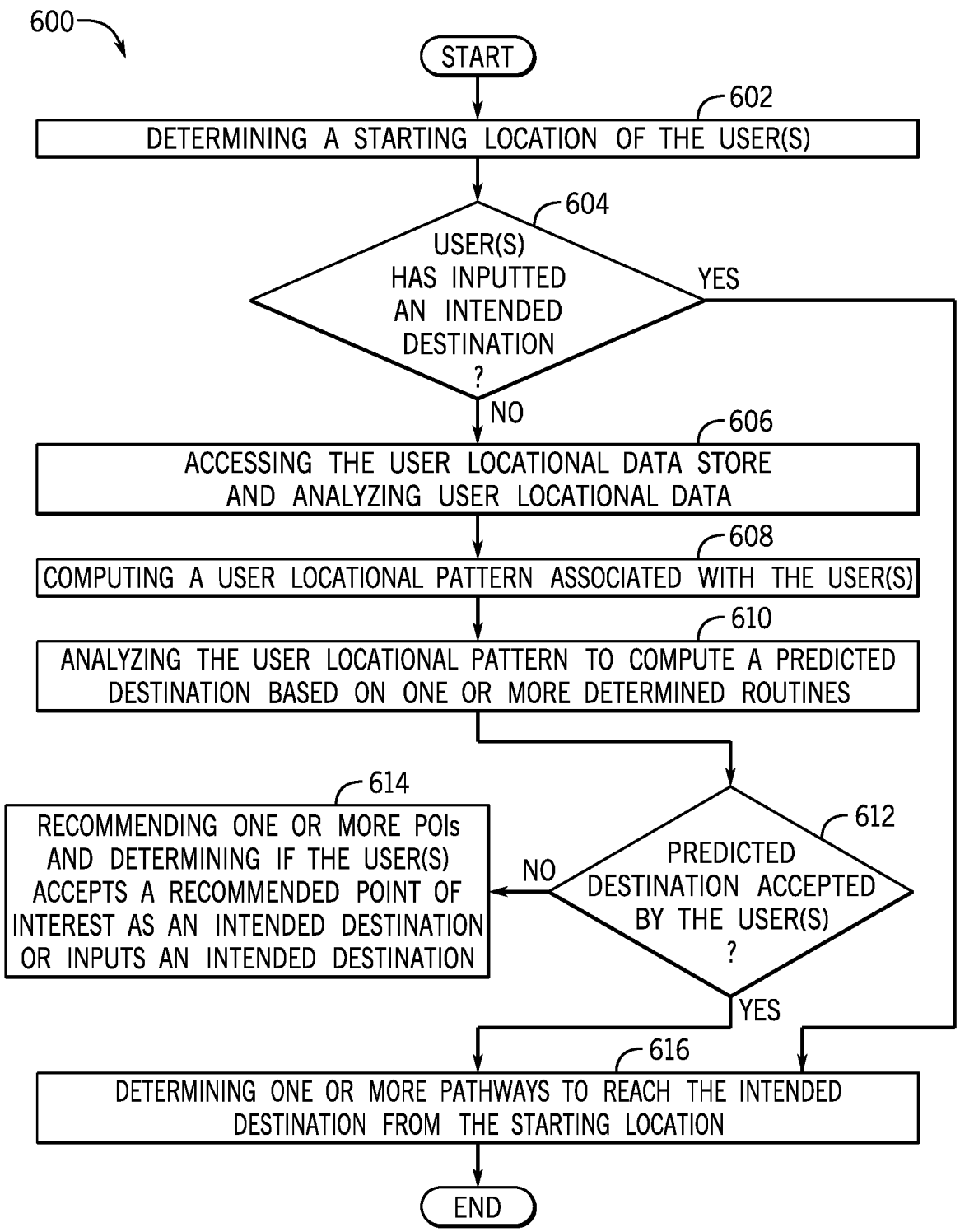
FIG. 6 is a process flow diagram of a method for determining and providing data associated with a starting location and a destination of user(s) according to an exemplary embodiment of the present disclosure.

FIG. 6 is a process flow diagram of a method 600 for determining and providing data associated with a starting location and a destination of the user(s) 104 according to an exemplary embodiment of the present disclosure. FIG. 6 will be described with reference to the components of FIG. 1, through it is to be appreciated that the method 600 of FIG. 6 may be used with additional and/or alternative system components. In an exemplary embodiment, the method 600 may be executed upon the receipt of an input by the user(s) 104 on one or more user interfaces of the shared vehicle application 106 that may indicate that the user(s) 104 wishes to receive one or more recommendations and/or make one or more reservations with respect to shared transportation and/or one or more points of interest. For example, a particular user 104 may input a user interface input icon that may be presented through one or more user interfaces of the shared vehicle application 106 that may be input by the user(s) 104 to allow the application 106 to execute one or more processes to thereby recommend one or more types of shared vehicles 102, one or more third-party transportation services 152, and/or one or more points of interest to the user(s) 104 at one or more points in time.

The method 600 may begin at block 602, wherein the method 600 may include determining a starting location of the user(s) 104. In an exemplary embodiment, the location determinant module 502 may be configured to determine the starting location of the user(s) 104 as a location of the user(s) 104 at a start of a trip to an intended destination and/or a predicted destination. It is appreciated that the determined starting location may have been previously determined as an intended destination or a predicted destination during a prior trip of the user(s) 104. In one configuration, the location determinant module 502 may be configured to communicate with the location sensors 136 of the portable device 108 to determine a current geo-location of the portable device 108. The location sensors 136 may be configured to determine the current geo-location of the portable device 108 and may output the current geo-location as current geo-locational coordinates of the portable device 108 to the location determinant module 502. The location determinant module 502 may be configured to determine the starting location of the user(s) 104 based on the current geo-locational coordinates of the portable device 108.

In some embodiments, the location determinant module 502 may be configured to access the map data stored on the storage unit 134 of the portable device 108 to determine directional data, distance data, environmental data, and point of interest related data pertaining to the starting location of the user(s) 104. In additional embodiments, the location determinant module 502 may be configured to determine if the user(s) 104 is located at a particular point of interest based on the analysis of the map data and the current geo-locational coordinates of the portable device 108.

The method 600 may proceed to block 604, wherein the method 600 may include determining if the user(s) 104 has inputted an intended destination. In an exemplary embodiment, upon determining the starting location of the user(s) 104, the location determinant module 502 may communicate data pertaining to the starting location of the user(s) 104 to the destination determinant module 504 and the recommendation module 506 of the shared vehicle application 106. In one configuration, the destination determinant module 504 may be configured to present an intended destination user interface prompt (not shown) to the user(s) 104 through the display unit 132 of the portable device 108.

The intended destination user interface prompt may be presented to enable the user(s) 104 to input one or more intended destinations that the user(s) 104 may intend to travel to from the starting location. More particularly, the intended destination user interface prompt may be presented to enable the user(s) 104 to input an address, a point of interest (e.g., home, workplace, restaurant), and/or a point of interest category (e.g., taco restaurant, shoe store) to be analyzed by the application 106. In one embodiment, the destination determinant module 504 may be configured to present the intended destination user interface prompt with a countdown timer that may be associated with the intended destination user interface prompt. The countdown timer may present a running countdown associated with a predetermined period of time that may be provided to the user(s) 104 to input an intended destination to the intended destination user interface prompt.

In another embodiment, the destination determinant module 504 may be configured to additionally or alternatively present the intended destination user interface prompt with a cancel user interface input icon that may be associated with the intended destination user interface prompt. The cancel user interface input icon may be inputted by the user(s) 104 to cancel the presentation of the intended destination user interface prompt. The cancel user interface icon may thereby be inputted by the user(s) 104 if the user(s) 104 does not wish to input an intended destination to the intended destination user interface prompt.

In one embodiment, the destination determinant module 504 may thereby determine if the user(s) 104 has inputted an intended destination based on determining that a respective input has been provided by the user(s) 104 to the intended destination user interface prompt. In one configuration, if the user(s) 104 does not provide the input regarding the intended destination through the intended destination user input prompt prior to the expiration of the running countdown and/or the user(s) 104 is determined to input the cancel user interface input icon, the destination determinant module 504 may thereby determine that the user(s) 104 has not inputted an intended destination.

If it is determined that the user(s) 104 has not inputted an intended destination (at block 604), the method 600 may proceed to block 606, wherein the method 600 may include accessing the user location data store 126 and analyzing user locational data. In an exemplary embodiment, upon determining that the user(s) 104 has not inputted an intended destination to the destination user interface prompt, the destination determinant module 504 may be configured to access the user location data store 126 stored on the memory 120 of the external server 110. As discussed above, the user location data store 126 may be associated with the user profile of the user(s) 104 and may include records that pertain to locations that maybe visited by the user(s) 104 at one or more particular timeframes. As discussed above, the application 106 may be configured to create a record that may be associated with a period of time (e.g., a day, a week, a month) and may update the record with locational data that may be associated with the same period of time.

Accordingly, upon determining that the user(s) 104 has not inputted an intended destination, the destination determinant module 504 may be configured to access the user location data store 126 to analyze the locational data included in one or more records of the data store 126 for one or more periods of time to thereby determine one or more routines that may be followed with respect to one or more locations that are visited by the user(s) 104. In an illustrative example, such routines may be associated with particular days of the week, such as work days and weekend days. Additionally, such routines may correspond to a daily schedule that the user(s) 104 may follow on one or more particular days of the week with respect to traveling to one or more particular destinations (e.g., points of interest, types of points of interest).

The method 600 may proceed to block 608, wherein the method 600 includes computing a user locational pattern associated with the user(s) 104. In an exemplary embodiment, the destination determinant module 504 may be configured to analyze the one or more routines as determined by the module 504 based on the user locational data stored within one or more records of the user location data store 126. In particular, the destination determinant module 504 may analyze one or more routines to determine one or more particular destinations that may be visited by the user(s) 104 during one or more periods of time. Based on the analysis of the routines, the destination determinant module 504 may be configured to compute the user locational pattern associated with the user(s) 104. The user locational pattern may include information as to routinely visited locations that may be visited by the user(s) 104 (e.g., home, work place, gym, stores, restaurants, etc.) at one or more points in time during a course of one or more timeframes (e.g., days, weeks, months).

The method 600 may proceed to block 610, wherein the method 600 may include analyzing the user locational pattern to compute a predicted destination based on one or more determined routines. In an exemplary embodiment, upon computing the user locational pattern, the destination determinant module 504 may be configured to determine a current point in time (e.g., current date and time) based on data that may be provided by a system clock (not shown) of the processor 112 of the external server 110 and/or the processor 130 of the portable device 108 used by the user(s) 104. Upon determining the current point in time, the destination determinant module 504 may be configured to evaluate the user locational pattern and may compute a predicted destination based on the one or more routinely visited destinations at one or more similar periods of time.

As an illustrative example, upon computing the locational pattern, the destination determinant module 504 may be configured to determine the current point in time as a Saturday at 11:00 AM in the month of June. The destination determinant module 504 may be configured to evaluate the user locational pattern and may compute a predicted destination of a particular restaurant or type of restaurant that may be based on one or more routinely visited destinations visited by the user(s) 104 on Saturday mornings between 10:30 AM and 12:00 PM.

The method 600 may proceed to block 612, wherein the method 600 may include determining if a predicted destination is accepted by the user(s) 104. In one or more embodiments, upon computing the predicted destination of the user(s) 104, the destination determinant module 504 may be configured to utilize the display unit 132 of the portable device 108 to present a predicted destination user interface prompt (not shown) to the user(s) 104. The predicted destination user interface prompt may include a description of the predicted destination (e.g., an address, a point of interest name, etc.). The predicted destination user interface prompt may additionally include an acceptance user interface input icon and a rejection user interface icon that may be inputted by the user(s) to accept the predicted destination as the intended destination of the user(s) 102 or reject the predicted destination as the intended destination of the user(s) 102. The destination determinant module 504 may accordingly determine if the user(s) 104 accepts or rejects the predicted destination based on the received input upon the acceptance user interface input icon or the rejection user interface input icon as provided through the display unit 132 of the portable device 108.

If it is determined that the predicted destination is not accepted by the user(s) 104 (at block 612), the method 600 may proceed to block 614, wherein the method 600 may include recommending one or more points of interests and determining if the user(s) 104 accepts a recommended point of interest as an intended destination or inputs an intended destination. In an exemplary embodiment, upon determining that the predicted destination is not accepted by the user(s) 104 as an intended destination of the user(s) 104, the destination determinant module 504 may communicate respective data in addition to data pertaining to the user locational pattern to the recommendation module 506 of the shared vehicle application 106.

In one or more embodiments, the recommendation module 506 may be configured to access the POI data repository 128 stored on the memory 120 of the external server 110. As discussed above, the POI data repository 128 may include various records that pertain to point of interest related data that is updated based on communication with the transportation and point of interest computing infrastructure 118. The point of interest data may include POI categories and associated points of interest. For example, POI categories may include, but may not be limited to, types of retailers, types of restaurants, types of businesses, and the like.

In one configuration, upon accessing the POI data repository 128, the recommendation module 506 may be configured to query the POI data repository 128 to determine one or more points of interest that are categorized into POI categories that may be located within a predetermined distance of the determined starting location. In another configuration, the recommendation module 506 may be configured to analyze the user locational pattern to determine one or more categories of points of interest that the user(s) 104 may have previously traveled to at one or more similar periods in time to the current point in time. The one or more categories of points of interest that the user(s) 104 may have traveled to at one or more similar periods in time may be based on categories of one or more routinely visited destinations that may include points of interest that are routinely visited by the user(s) 104 during one or more similar periods of time as determined based on the analysis of the user locational pattern. The recommendation module 506 may additionally or alternatively be configured to query the POI data repository 128 to determine one or more points of interest that are categorized into POI categories that match the gathered user locational data categories of one or more routinely visited destinations based on the analysis of the user locational pattern.

Upon determining one or more points of interests that are categorized into POI categories that are located at particular geo-locations and/or that match the gathered user locational data categories of one or more routinely visited destinations of the user(s) 104, the recommendation module 506 may be configured to utilize the display unit 132 of the portable device 108 to present a point of interest recommendation user interface (POI recommendation user interface) of the shared vehicle application 106 to the user(s) 104 using the portable device 108. The POI recommendation user interface may be presented with one or more recommended points of interest that may be categorized in one or more POI categories that are located at particular geo-locations and/or that match the gathered user locational data categories of one or more routinely visited destinations of the user(s) 104. The one or more recommended points of interest may be presented as user input interface icons on the POI recommendation user interface and may be inputted to be selected by the user(s) 104 as an intended destination. In one or more embodiments, if the user(s) 104 provides an input to one of the user interface input icons to select one of the recommended points of interest as an intended destination, the recommendation module 506 may communicate data pertaining to the selected recommended point of interest to the destination determinant module 504 to be analyzed as data that pertains to an intended destination of the user(s) 104.

In one embodiment, the POI recommendation user interface may additionally include an intended destination input icon that may be inputted by the user(s) 104 who wishes to input their own intended destination that may not be presented as a recommended point of interest. In one configuration, upon input of the intended destination input icon, the recommendation module 506 may be configured to communicate data pertaining to the input of the intended destination input icon to the destination determinant module 504. The destination determinant module 504 may thereby present the intended destination user interface prompt to the user(s) 104 (discussed above with respect to block 604) to enable the user(s) 104 to input their intended destination in the form of an address, a point of interest (e.g., name of a point of interest, home, school, work place, etc.), and/or a point of interest category (e.g., taco restaurant, shoe store) to be analyzed by the application 106.

Upon determining that the predicted destination is accepted by the user(s) 104 (at block 612) or the user(s) 104 accepts a recommended point of interest as an intended destination or inputs an intended destination (at block 614), the method 600 may proceed to block 616, wherein the method 600 may include determining one or more pathways to reach the intended destination from the stating location. In one embodiment, upon determining that the predicted destination or a recommended point of interest is accepted by the user(s) 104, the location determinant module 502 may thereby classify the predicted destination or the recommended point of interest as an intended destination of the user(s) 104.

As discussed above, the storage unit 134 of the portable device 108 may be configured to store map data. In one embodiment, the location determinant module 502 may be configured to communicate with the location sensors 136 of the portable device 108 to determine geo-locational coordinates that may be associated with the geo-location of the intended destination. Upon determining the geo-locational coordinates associated with the geo-location of the intended destination, the location determinant module 502 may access the map data stored on the storage unit 134 to determine directional data, distance data, environmental data, and point of interest related data pertaining to the intended destination.

The location determinant module 502 may analyze the data pertaining to geographical maps and satellite/aerial imagery of one or more locations and may determine one or more pathways (e.g., navigable paths, trails, streets, highways, etc.) that may be utilized by the user(s) 104 to travel from the starting location to the intended destination. In one or more embodiments, the one or more pathways may be determined as pathways that may be utilized by one or more types of shared vehicles 102. For example, one or pathways may be determined that include bicycle paths based on the user(s) 104 possibly utilizing a shared bicycle and one or more different pathways that may include highways that may be determined based on the user(s) 104 possibly utilizing a shared automobile. Accordingly, one or more respective pathways may be determined that may pertain to one or more respective types of shared vehicles 102.

Figure 7:
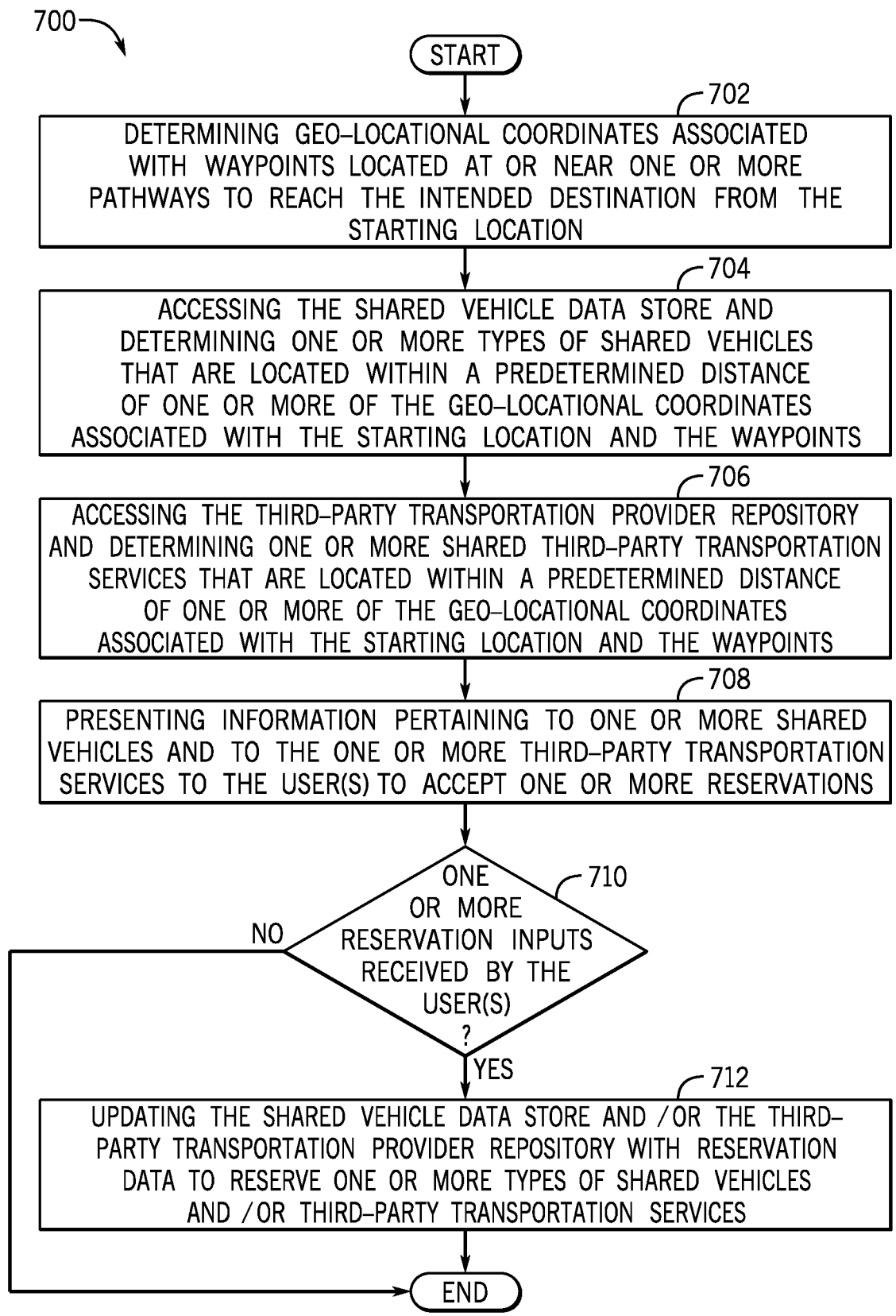
FIG. 7 is a process flow diagram of a method for recommending and reserving shared transportation according to an exemplary embodiment of the present disclosure.

FIG. 7 is a process flow diagram of a method 700 for recommending and reserving shared transportation according to an exemplary embodiment of the present disclosure. FIG. 7 will be described with reference to the components of FIG. 1, through it is to be appreciated that the method 700 of FIG. 7 may be used with additional and/or alternative system components. In one embodiment, the method 700 of FIG. 7 may be executed by the shared vehicle application 106 upon determining one or more pathways that may be utilized by the user(s) 104 to reach an intended destination.

The method 700 may begin at block 702, wherein the method 700 may include determining geo-locational coordinates associated with waypoints located as part of one or more pathways that may be traveled to reach the intended destination from the starting location. In an exemplary embodiment, the location determinant module 502 may be configured to analyze the map data stored on the storage unit 134 of the portable device 108 to determine waypoints that may be located at one or more of the pathways (determined at block 616 of the method 600 of FIG. 6). In one embodiment, the waypoints may include one or more specified geo-locational coordinates associated with specified geographical locations that may be used to define one or more navigable routes of the one or more pathways.

The waypoints may be determined to be included at one or more predetermined distances (e.g., every 1000 feet) of the one or more pathways. Accordingly, the one or more pathways may be determined to include numerous waypoints that may potentially be located at one or more pathways that may be traveled by the user(s) 104 to reach their intended destination from the starting location. In an exemplary embodiment, upon determining the waypoints, the location determinant module 502 may analyze the map data and may determine geo-locational coordinates that may be associated with each of the waypoints determined at each of the one or more pathways.

The method 700 may proceed to block 704, wherein the method 700 may include accessing the shared vehicle data store 122 and determining one or more types of shared vehicles 102 that are located within a predetermined distance of one or more of the geo-locational coordinates associated with the waypoints. In one or more embodiments, upon determining the geo-locational coordinates associated with the waypoints located at one or more pathways that may be traveled by the user(s) 104, the location determinant module 502 may be configured to communicate respective data to the recommendation module 506.

In one configuration of the application 106, upon receipt of the data pertaining to the geo-locational coordinates associated with the waypoints, the destination travel user interface may be configured to utilize the display unit 132 to present a destination travel user interface through the portable device 108 used by the user(s) 104. The destination travel user interface may include one or more touch input user interface inputs that may allow the user(s) 104 to input one or more details regarding the travel of the user(s) 104 to the intended destination. In one embodiment, such details may include a number of expected individuals that may accompany the user(s) 104 to the intended destination from the starting location.

The user(s) 104 may input a number of individuals that may be expected to accompany the user(s) 104 to the intended destination if additional individuals are expected to accompany the user(s) 104 during travel to the intended destination. The destination travel user interface may also enable the user(s) 104 to input one or more types of shared vehicles 102 and/or one or more types of third-party transportation services 152 that the user(s) 104 would prefer to utilize to reach the intended destination. Additionally, the destination travel user interface may enable the user(s) 104 to input one or more types of shared vehicles 102 and/or one or more types of third-party transportation services 152 that the user(s) 104 would prefer not to utilize to teach the intended destination.

In an additional embodiment, the destination travel user interface may enable the user(s) 104 to store preferences associated with one or more types of shared vehicles 102 and/or one or more types of third-party transportation services 152 that the user(s) 104 would prefer to utilize and/or the user(s) 104 would prefer not to utilize to reach one or more intended destinations (e.g., specific intended destinations or all intended destinations in general). Such preferences may be stored upon the user profile (discussed above) that is associated with the user(s) 104. In some embodiments, the recommendation module 506 may be configured to analyze the user profile that is associated with the user(s) 104 to determine one or more types of shared vehicles 102 and/or one or more types of third-party transportation services 152 that the user(s) 104 would prefer to utilize and/or the user(s) 104 would prefer not to utilize to reach one or more intended destinations.

In an exemplary embodiment, the recommendation module 506 may be configured to access the shared vehicle data store 122 stored on the memory 120 of the external server 110. As discussed above, the shared vehicle data store 122 may include one or more records that may include data that pertains to a respective shared vehicle 102. Such data may be populated by the business entity and may pertain to, but may not be limited to, a type of shared vehicle 102, a description of the shared vehicle 102, a real-time lease price of the shared vehicle 102 that may be based on a period of time and/or a distance of travel, and the like. The one or more records of the shared vehicle data store 122 may additionally include real-time information pertaining to a current real-time geo-location of each shared vehicle 102. Additionally, each record may also include a current leasing status of the shared vehicle(s) 102, a leasing schedule associated with the shared vehicle(s) 102, a real-time fuel/energy level of the shared vehicle(s) 102, and the like.

In one or more embodiments, upon accessing the shared vehicle data store 122, the recommendation module 506 may be configured to query the shared vehicle data store 122 with the geo-locational coordinates associated with the geo-location of the starting location and the geo-locational coordinates associated with the waypoints located at one or more of the pathways (determined at block 616 of the method 600) to determine one or more types of shared vehicles 102 that may be recommended to the user(s) 104. In particular, the recommendation module 506 may be configured to query the shared vehicle data store 122 to determine one or more types of shared vehicles 102 that may be available to be leased and may be located within a predetermined distance (e.g., 1 mile) of one or more of the geo-locational coordinates associated with the starting location and/or the waypoints.

In one embodiment, the recommendation module 506 may be configured to query the shared vehicle data store 122 to determine one or more types of shared vehicles 102 based on a number of additional individuals that are expected to accompany the user(s) 104 during travel to the intended destination as inputted by the user(s) 104 to the destination travel user interface. More specifically, in circumstances in which the user(s) 104 has inputted a number of additional individuals that may accompany the user(s), the recommendation module 506 may be configured to query one or more records of the shared vehicle data store 122 with the geo-locational coordinates associated with the geo-location of the starting location and the geo-locational coordinates associated with the waypoints located at one or more of the pathways for one or more types of shared vehicles 102 that are available for lease that may be able to accommodate the user(s) 104 and the number of additional individuals. Accordingly, the recommendation module 506 may be configured to ensure that one or more types of shared vehicles 102 that may accommodate the user(s) 104 and the number of additional individuals that may accompany the user(s) 104 to the intended destination may be recommended to the user(s) 104.

In another embodiment, the recommendation module 506 may be configured to query the shared vehicle data store 122 to determine one or more types of shared vehicles that may be preferred by the user(s) 104 and/or not preferred by the user(s) 104. More specifically, in circumstances in which the user(s) 104 has inputted a preference for one or more types of shared vehicles 102 and/or a preference not to utilize one or more types of shared vehicles 102, the recommendation module 506 may be configured to query one or more records of the shared vehicle data store 122 with the geo-locational coordinates associated with the geo-location of the starting location and the geo-locational coordinates that may include the one or more types of shared vehicles 102 that are preferred and/or not preferred. Accordingly, the recommendation module 506 may be configured to ensure that one or more types of shared vehicles 102 that may be preferred may be recommended to the user(s) 104 and that one or more types of shared vehicles 102 that may not be preferred are not recommended to the user(s) 104.

The method 700 may proceed to block 706, wherein the method 700 may include accessing the third-party transportation provider repository 124 and determining one or more third-party transportation services 152 that are located within a predetermined distance of one or more of the geo-locational coordinates associated with the waypoints. In an exemplary embodiment, the recommendation module 506 may be configured to access the third-party transportation provider repository 124 stored on the memory 120 of the external server 110. As discussed above, the third-party transportation provider repository 124 may include various records that may each pertain to third-party transportation services 152 that may be operated by one or more transportation providers (e.g., bus operators, train operators, taxi service providers, and/or ride share providers). Such data may be populated based on data that is provided from the transportation and point of interest computing infrastructure 118 and may pertain to, but may not be limited to, a description of the third-party transportation services 152, a price associated with each third-party transportation service 152 that may be based on a period of time and/or a distance of travel, and the like. The one or more records of the third-party transportation provider repository 124 may additionally include real-time information pertaining to a current real-time geo-location of each third-party transportation service 152. Additionally, each record may also include a current schedule associated with a respective third-party transportation service 152 and/or a classification of a pricing structure associated with the type of third-party transportation service 152 (e.g., peak pricing, off-peak pricing).

In one or more embodiments, upon accessing the third-party transportation provider repository 124, the recommendation module 506 may be configured to query the third-party transportation provider repository 124 with the geo-locational coordinates associated with the geo-location of the starting location and the geo-locational coordinates associated with the waypoints located at one or more of the pathways (determined at block 616 of the method 600) to determine one or more third-party transportation services 152 that may be recommended to the user(s) 104. In particular, the recommendation module 506 may be configured to query the third-party transportation provider repository 124 to determine one or more third-party transportation services 152 that may be located within a predetermined distance (e.g., 1 mile) of one or more of the geo-locational coordinates associated with the starting location and/or the waypoints and that may be available to be leased.

In one embodiment, the recommendation module 506 may be configured to query the third-party transportation provider repository 124 to determine one or more third-party transportation services 152 based on a number of additional individuals that are expected to accompany the user(s) 104 during travel to the intended destination as inputted by the user(s) 104 to the destination travel user interface. More specifically, in circumstances in which the user(s) 104 has inputted a number of additional individuals that may accompany the user(s), the recommendation module 506 may be configured to query one or more records of the third-party transportation provider repository 124 with the geo-locational coordinates associated with the geo-location of the starting location and the geo-locational coordinates associated with the waypoints located at one or more of the pathways for one or more third-party transportation services 152 that may be able accommodate the user(s) 104 and the number of additional individuals. Accordingly, the recommendation module 506 may be configured to ensure that one or more third-party transportation services 152 that may accommodate the user(s) 104 and the number of additional individuals that may accompany the user(s) 104 to the intended destination may be recommended to the user(s) 104.

The method 700 may proceed to block 708, wherein the method 700 may include presenting information pertaining to one or more shared vehicles 102 and/or one or more third-party transportation services 152 to the user(s) 104 to accept one or more reservations. In an exemplary embodiment, upon determining one or more types of shared vehicles 102 that may be recommended to the user(s) 102 based on data determined at block 704 and determining one or more third-party transportation services 152 based on data determined at block 706, the recommendation module 506 may be configured to utilize the display unit 132 of the portable device 108 to present one or more recommendation user interfaces to the user(s) 104.

In particular, the recommendation module 506 may be configured to present one or more recommendation user interfaces (as shown in FIGS. 2, 3, and 4) through the display unit 132 of the external server 110. The one or more recommendation user interfaces may include user interface input icons that may be associated with one or more types of shared vehicles 102 that may be determined to be located within a predetermined distance of the starting location and/or one or more of the waypoints of the one or more pathways to the intended destination (as determined at block 706). Associated information pertaining to the one or more types of shared vehicles 102 may also be presented to the user(s) 104, including, but not limited to, leasing location data, returning location data, pricing data, make/model of available shared vehicle(s) 102, and the like. One or more recommendation user interfaces may also be presented with user interface input icons that may be associated one or more third-party transportation services 152, location data, price data, and/or timing data that may be presented to the user(s) 104 to recommend one or more third-party transportation services 152 to the user(s) 104.

As an illustrative example, in some circumstances, the recommendation module 506 may recommend one or more types of shared vehicles 102 that may be utilized by the user(s) 104 during one or more portions of travel using the pathway(s) to reach the intended destination. Additionally, the recommendation module 506 may recommend one or more third-party transportation services 152 that may be utilized by the user(s) 104 during one or more portions of travel using the pathway(s) to reach the intended destination. The recommendation module 506 may present user interface input icons and data associated with the one or more types of shared vehicles 102 and/or one or more third-party transportation services 152 to recommend to the user(s) 104 one or more of the types of shared vehicles 102 and/or third-party transportation services 152 that may be reserved.

The method 700 may proceed to block 710, wherein the method 700 may include determining if one or more reservation inputs have been received by the user(s) 104. In an exemplary embodiment, the recommendation module 506 may be configured to determine when one or more user interface input icons that may be associated with one or more types of shared vehicles 102 have been inputted by the user(s) 104 to enable the user(s) 104 to reserve the type of shared vehicle(s) 102 to be leased at a particular location, at a particular point in time, at a particular price point, for a particular timeframe, and/or to be returned at a particular location.

The recommendation module 506 may also be configured to determine when one or more user interface input icons that may be associated with one or more third-party transportation services 152 have been inputted by the user(s) 104 to reserve one or more third-party transportation services 152 at a particular location, at a particular point in time, at a particular price point, for a particular timeframe, and/or to reach a particular location. In one embodiment, upon determining the input of one or more user interface input icons that may be associated with one or more types of shared vehicles 102 and/or one or more third-party transportation services 152, the recommendation module 506 may communicate data pertaining to one or more respective user inputs to the reservation module 508 of the shared vehicle application 106. Alternatively, if the reservation module 508 may determine that one or more reservation inputs may not be provided by the user(s) 104 upon determining that the user(s) 104 has not inputted one or more user interface input icons that may be associated with one or more types of shared vehicles 102 and/or one or more third-party transportation services 152 upon an expiration of a predetermined period of time (e.g., 10 minutes).

If it is determined that one or more reservation inputs have been received by the user(s) 104 (at block 710), the method 700 may proceed to block 712, wherein the method 700 may include updating the shared vehicle data store 122 and/or the third-party transportation provider repository 124 to reserve one or more types of shared vehicles 102 and/or one or more third-party transportation services 152. In an exemplary embodiment, upon receiving the communication from the recommendation module 506 pertaining to the one or more reservation inputs associated with the reservation of one or more types of shared vehicles 102, the reservation module 508 may be configured to access the shared vehicle data store 122 and may update one or more records associated with one or more types of shared vehicles 102 with reservation data that pertains to the type of shared vehicle(s) 102 to be leased at a particular location, at a particular point in time, at a particular price point, for a particular timeframe, and/or to be returned at a particular location. The business entity may thereby determine one or more particular shared vehicles 102 that are to be reserved for the user(s) 104 to be leased a particular location, at a particular point in time, at a particular price point, for a particular timeframe, and/or to be returned at a particular location. In some configurations, the business entity may communicate a reservation confirmation (e.g., via the display unit 132, via e-mail) to the user(s) 104 to provide an electronic conformation of the reservation of one or more particular shared vehicles 102 that are to be leased by the user(s) 104. The user(s) 104 may accordingly utilize one or more particular shared vehicles 102 as reserved to reach one or more locations and/or the intended destination.

In one embodiment, upon receiving the communication from the recommendation module 506 pertaining to the one or more reservation inputs associated with the reservation of one or more third-party transportation services 152, the reservation module 508 may be configured to access the third-party transportation provider repository 124 and may update one or more records associated with one or more third-party transportation services 152 with reservation data that pertains to one or more third-party transportation services 152 at a particular location, at a particular point in time, at a particular price point, for a particular timeframe, and/or to reach a particular location. In some configurations, the third-party transportation services 152 may communicate a confirmation (e.g., via the display unit 132, e-mail) to the user(s) 104 to provide an electronic conformation of the reservation and/or an electronic ticket that may be used to utilize one or more third-party transportation services 152. The user(s) 104 may accordingly utilize one or more third-party transportation services 152 as reserved to reach one or more locations and/or the intended destination.

Figure 8:
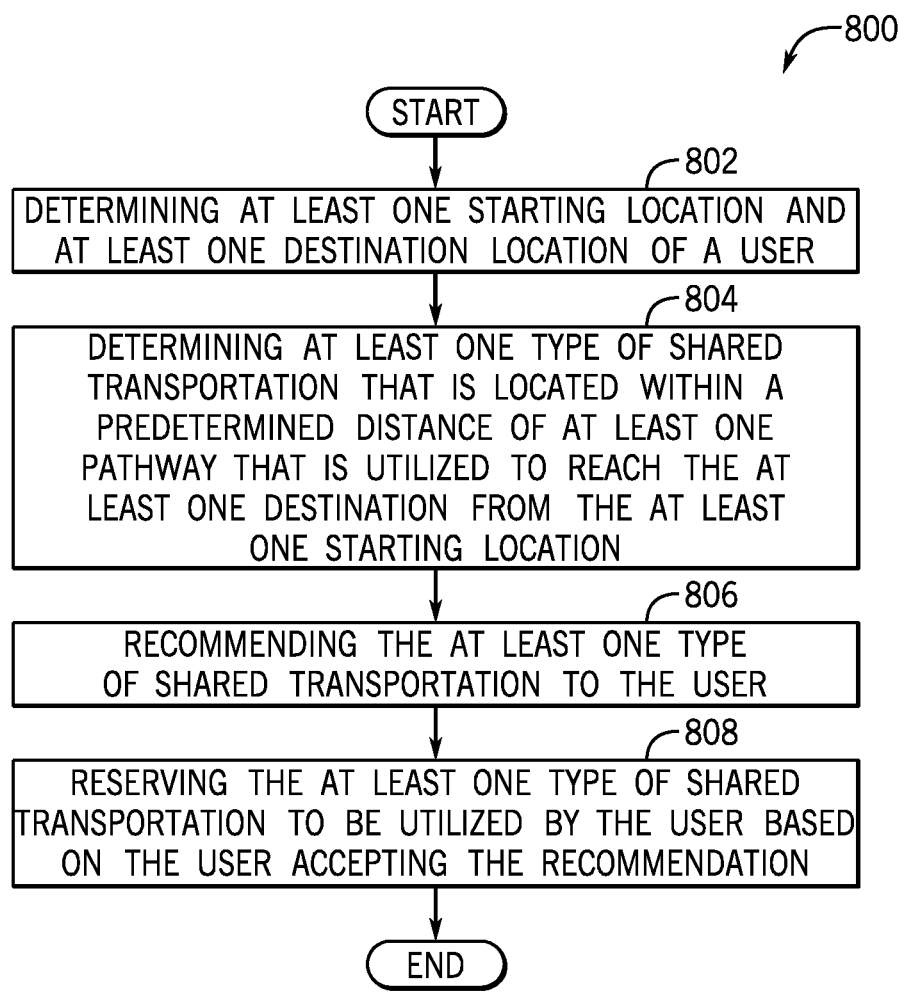
FIG. 8 is a process flow diagram of a method for recommending shared transportation according to an exemplary embodiment of the present disclosure.

FIG. 8 is a process flow diagram of a method 800 for recommending shared transportation according to an exemplary embodiment of the present disclosure. FIG. 8 will be described with reference to the components of FIG. 1, through it is to be appreciated that the method 800 of FIG. 8 may be used with additional and/or alternative system components.

The method 800 may begin at block 802, wherein the method 800 may include determining at least one starting location and at least one destination location of a user 104.

The method 800 may proceed to block 804, wherein the method 800 may include determining at least one type of shared transportation that is located within a predetermined distance of at least one pathway that is utilized to reach the at least one destination from the at least one starting location.

The method 800 may proceed to block 806, wherein the method 800 may include recommending the at least one type of shared transportation to the user 104. The method 800 may proceed to block 808, wherein the method 800 may include reserving the at least one type of shared transportation to be utilized by the user 104 based on the user 104 accepting the recommendation.

It should be apparent from the foregoing description that various exemplary embodiments of the disclosure may be implemented in hardware. Furthermore, various exemplary embodiments may be implemented as instructions stored on a non-transitory machine-readable storage medium, such as a volatile or non-volatile memory, which may be read and executed by at least one processor to perform the operations described in detail herein. A machine-readable storage medium may include any mechanism for storing information in a form readable by a machine, such as a personal or laptop computer, a server, or other computing device. Thus, a non-transitory machine-readable storage medium excludes transitory signals but may include both volatile and non-volatile memories, including but not limited to read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

It will be appreciated that various implementations of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A computer-implemented method for recommending shared transportation, comprising:
    determining at least one starting location of a user using a current location of a mobile device and a current system clock of a computing system;
    determining at least one destination location of the user using at least one predicted destination of the user and the current system clock of the computing system, to predict where the user intends to be at a future timeframe,
    wherein the mobile device determines the at least one predicted destination of the user by analyzing a user locational pattern of the mobile device associated with the user including information as to locations that are routinely visited by the user carrying the mobile device during a past timeframe, wherein the mobile device determines the at least one predicted destination from past locations that were routinely visited by the user, wherein a current timeframe is determined by the mobile device using the current system clock of the computing system, wherein the past timeframe is determined by the mobile device using the system clock of the computing system and wherein the past timeframe is similar to the current timeframe, communicating the at least one starting location and the at least one destination location of the user with an electronic computing system of a shared transportation service to electronically access and query a third-party transportation provider repository to determine at least one type of shared transportation that is located within a predetermined distance of at least one pathway that is utilized to reach the at least one destination from the at least one starting location, wherein the third-party transportation provider repository includes real-time information pertaining to a current real-time geo-location of the at least one type of shared transportation using current geo-locational coordinates provided by global positioning sensors of the at least one type of shared transportation, a current leasing status of the at least one type of shared transportation, a leasing schedule associated with the at least one type of shared transportation, and a real-time fuel or energy level of the at least one type of shared transportation;

electronically controlling a display unit to present a graphical user interface to recommend the at least one type of shared transportation to the user to the at least one predicted destination by querying the third-party transportation provider repository and electronically controlling the display unit to present the graphical user interface to present an intended destination user interface prompt with a countdown timer, wherein if no user input is received at the intended destination user interface by an expiration of the countdown timer, the recommendation for the at least one type of shared transportation to the at least one predicted destination is cancelled; and electronically reserving the at least one type of shared transportation to be utilized by the user based on the user accepting the recommendation, wherein electronically reserving the at least one type of shared transportation includes electronically accessing and updating the third-party transportation provider repository with reservation data that includes details that are associated with the reservation of the at least one type of shared transportation.

2. The computer-implemented method of claim 1, wherein determining the at least one starting location includes communicating with location sensors of a portable device that is used by the user to determine current geo-location coordinates of the portable device.

3. The computer-implemented method of claim 1, wherein the at least one type of shared transportation includes at least one type of shared vehicle, wherein the at least one type of shared vehicle includes at least one of: an automobile, a standing scooter, a scooter bike, a moped bike, a motor cycle, and a bicycle.

4. The computer-implemented method of claim 3, wherein determining the at least one type of shared transportation includes determining at least one type of shared vehicle that is available to be leased and is located within a predetermined distance of at least one of: the starting location, the at least one destination of the user, and at least one waypoint of the at least one pathway that is utilized to reach the at least one destination from the at least one starting location.

5. The computer-implemented method of claim 4, wherein the at least one type of shared transportation includes at least one third-party transportation service, wherein the at least one transportation service includes at least one of: a taxi service, a ride share service, a bus service, a train service, and a trolley service.

6. The computer-implemented method of claim 5, wherein determining the at least one type of shared transportation includes determining at least one third-party transportation service that is located within a predetermined distance of at least one of: the starting location, the at least one destination of the user, and the at least one waypoint of the at least one pathway that is utilized to reach the at least one destination from the at least one starting location.

7. The computer-implemented method of claim 6, wherein recommending the at least one type of shared vehicle includes presenting at least one recommendation pertaining to at least one of: the at least one type of shared vehicle and the at least one third-party transportation service.

8. The computer-implemented method of claim 7, wherein electronically reserving the at least one type of shared transportation includes receiving a user input pertaining to a reservation of at least one of: the at least one type of shared vehicle and the at least one third-party transportation service that are recommended to the user, wherein reservation data is updated and accessible by an owner or operator of the at least one type of shared vehicle and the at least one third-party transportation service.

9. A system for recommending shared transportation, comprising:

a memory storing instructions when executed by a processor cause the processor to:

determine at least one starting location of a user using a current location of a mobile device and a current system clock of a computing system;

determine at least one destination location of the user using at least one predicted destination of the user and the current system clock of the computing system, to predict where the user intends to be at a future timeframe, wherein the mobile device determines the at least one predicted destination of the user by analyzing a user locational pattern of the mobile device associated with the user including information as to locations that are routinely visited by the user carrying the mobile device during a past timeframe, wherein the mobile device determines the at least one predicted destination from past locations that were routinely visited by the user, wherein a current timeframe is determined by the mobile device using the current system clock of the computing system, wherein the past timeframe is determined by the mobile device using the system clock of the computing system and wherein the past timeframe is similar to the current timeframe, communicate the at least one starting location and the at least one destination location of the user with an electronic computing system of a shared transportation service to electronically access and query a third-party transportation provider repository to determine at least one type of shared transportation that is located within a predetermined distance of at least one pathway that is utilized to reach the at least one destination from the at least one starting location, wherein the third-party transportation provider repository includes real-time information pertaining to a current real-time geo-location of the at least one type of shared transportation using current geo-locational coordinates provided by global positioning sensors of the at least one type of shared transportation, a current leasing status of the at least one type of shared transportation, a leasing schedule associated with the at least one type of shared transportation, and a real-time fuel or energy level of the at least one type of shared transportation;

electronically control a display unit to present a graphical user interface to recommend the at least one type of shared transportation to the user to the at least one predicted destination by querying the third-party transportation provider repository and electronically control the display unit to present the graphical user interface to present an intended destination user interface prompt with a countdown timer, wherein if no user input is received at the intended destination user interface by an expiration of the countdown timer, the recommendation for the at least one type of shared transportation to the at least one predicted destination is cancelled; and electronically reserve the at least one type of shared transportation to be utilized by the user based on the user accepting the recommendation, wherein electronically reserving the at least one type of shared transportation includes electronically accessing and updating the third-party transportation provider repository with reservation data that includes details that are associated with the reservation of the at least one type of shared transportation.

10. The system of claim 9, wherein determining the at least one starting location includes communicating with location sensors of a portable device that is used by the user to determine current geo-location coordinates of the portable device.

11. The system of claim 9, wherein the at least one type of shared transportation includes at least one type of shared vehicle, wherein the at least one type of shared vehicle includes at least one of: an automobile, a standing scooter, a scooter bike, a moped bike, a motor cycle, and a bicycle.

12. The system of claim 11, wherein determining the at least one type of shared transportation includes determining at least one type of shared vehicle that is available to be leased and is located within a predetermined distance of at least one of: the starting location, the at least one destination of the user, and at least one waypoint of the at least one pathway that is utilized to reach the at least one destination from the at least one starting location.

13. The system of claim 12, wherein the at least one type of shared transportation includes at least one third-party transportation service, wherein the at least one transportation service includes at least one of: a taxi service, a ride share service, a bus service, a train service, and a trolley service.

14. The system of claim 13, wherein determining the at least one type of shared transportation includes determining at least one third-party transportation service that is located within a predetermined distance of at least one of: the starting location, the at least one destination of the user, and the at least one waypoint of the at least one pathway that is utilized to reach the at least one destination from the at least one starting location.

15. The system of claim 14, wherein recommending the at least one type of shared vehicle includes presenting at least one recommendation pertaining to at least one of: the at least one type of shared vehicle and the at least one third-party transportation service.

16. The system of claim 15, wherein reserving the at least one type of shared transportation includes receiving a user input pertaining to a reservation of at least one of: the at least one type of shared vehicle and the at least one third-party transportation service that are recommended to the user, wherein reservation data is updated and accessible by an owner or operator of the at least one type of shared vehicle and the at least one third-party transportation service.

17. A non-transitory computer readable storage medium storing instructions that when executed by a computer, which includes a processor perform a method, the method comprising:

determining at least one starting location of a user using a current location of a mobile device and a current system clock of a computing system;

determining at least one destination location of the user using at least one predicted destination of the user and the current system clock of the computing system, to predict where the user intends to be at a future timeframe, wherein the mobile device determines the at least one predicted destination of the user by analyzing a user locational pattern of the mobile device associated with the user including information as to locations that are routinely visited by the user carrying the mobile device during a past timeframe, wherein the mobile device determines the at least one predicted destination from past locations that were routinely visited by the user, wherein a current timeframe is determined by the mobile device using the current system clock of the computing system, wherein the past timeframe is determined by the mobile device using the system clock of the computing system and wherein the past timeframe is similar to the current timeframe, communicating the at least one starting location and the at least one destination location of the user with an electronic computing system of a shared transportation service to electronically access and query a third-party transportation provider repository to determine at least one type of shared transportation that is located within a predetermined distance of at least one pathway that is utilized to reach the at least one destination from the at least one starting location, wherein the third-party transportation provider repository includes real-time information pertaining to a current real-time geo-location of the at least one type of shared transportation using current geo-locational coordinates provided by global positioning sensors of the at least one type of shared transportation, a current leasing status of the at least one type of shared transportation, a leasing schedule associated with the at least one type of shared transportation, and a real-time fuel or energy level of the at least one type of shared transportation;

electronically controlling a display unit to present a graphical user interface to recommend the at least one type of shared transportation to the user to the at least one predicted destination by querying the third-party transportation provider repository and electronically controlling the display unit to present the graphical user interface to present an intended destination user interface prompt with a countdown timer, wherein if no user input is received at the intended destination user interface by an expiration of the countdown timer, the recommendation for the at least one type of shared transportation to the at least one predicted destination is cancelled; and electronically reserving the at least one type of shared transportation to be utilized by the user based on the user accepting the recommendation, wherein electronically reserving the at least one type of shared transportation includes electronically accessing and updating the third-party transportation provider repository with reservation data that includes details that are associated with the reservation of the at least one type of shared transportation.

18. The non-transitory computer readable storage medium of claim 17, wherein electronically reserving the at least one type of shared transportation includes receiving a user input pertaining to a reservation of at least one of: at least one type of shared vehicle and at least one third-party transportation service that are recommended to the user, wherein reservation data is updated and accessible by an owner or operator of the at least one type of shared vehicle and the at least one third-party transportation service.

* * * * *